(12) United States Patent
Derbyshire et al.

(10) Patent No.: US 6,545,599 B2
(45) Date of Patent: Apr. 8, 2003

(54) TIRE CONDITION MONITORING SYSTEM

(76) Inventors: Andrew John Derbyshire, 12 Poplar Avenue, New Mills, Stockport, Cheshire (GB), SK12 4HR; Jeremy Francis Siddons, 70 Nunsfield Road, Buxton, Derbyshire (GB), SK17 7BN; John Kitto Richards, 3 Brierley Park, Buxworth, Whaley Bridge, Derbyshire (GB), SK12 7NW; Edward Charles Gibson, 51 Windsor Road, Fairfield, Buxton, Derbyshire (GB), SK17 7NS; Sean Patrick Davies, Palace Court, Flat 3, 9 Scarsdale Place, Buxton, Derbyshire (GB), SK17 6EF ( * ) Notice: Subject to any disclaimer, the term of this patent is extended or adjusted under 35 U.S.C. 154(b) by 0 days.

(21) Appl. No.: 09/921,675

(22) Filed: Aug. 6, 2001

(65) Prior Publication Data

US 2002/0044050 A1 Apr. 18, 2002

(Under 37 CFR 1.47)

Related U.S. Application Data

(62) Division of application No. 08/793,586, filed as application No. PCT/GB95/02060 on Aug. 31, 1995, now Pat. No. 6,271,748.

(30) Foreign Application Priority Data

Aug. 31, 1994 (GB) ............................................. 9417519
Mar. 13, 1995 (GB) ............................................. 9505016
Jun. 2, 1995 (GB) ............................................. 9511182

(51) Int. Cl.[7] ......................... B60C 23/00; B60C 23/02
(52) U.S. Cl. ....................... 340/442; 340/447; 73/146.5
(58) Field of Search ................................. 340/442, 447, 340/445, 444; 73/146.5, 146.3, 146.4; 200/61.22

(56) References Cited

U.S. PATENT DOCUMENTS

| | | |
|---|---|---|
| 4,703,650 A | 11/1987 | Dosjoub et al. |
| 4,737,761 A | 4/1988 | Dosjoub et al. |
| 4,823,107 A | 4/1989 | Pompier |
| 4,837,553 A | 6/1989 | Pompier |
| 4,843,872 A | 7/1989 | Hebert et al. |
| 4,893,110 A | 1/1990 | Hebert |
| 5,029,468 A | 7/1991 | Dosjoub |
| 5,054,315 A | 10/1991 | Dosjoub |
| 5,285,189 A | 2/1994 | Nowicki et al. |
| 5,289,160 A | 2/1994 | Fiorletta |
| 5,463,374 A | 10/1995 | Mendez et al. |
| 5,483,827 A | 1/1996 | Kulka et al. |
| 5,559,484 A | 9/1996 | Nowicki et al. |
| 5,569,848 A * | 10/1996 | Sharp ......................... 73/146.2 |
| 5,602,524 A * | 2/1997 | Mock et al. ................. 340/447 |
| 5,656,993 A | 8/1997 | Coulthard |
| 5,731,754 A | 3/1998 | Lee, Jr. et al. |
| 5,824,891 A | 10/1998 | Monson |
| 5,929,755 A * | 7/1999 | Hsieh ......................... 340/442 |
| 5,945,908 A * | 8/1999 | Nowicki et al. ............. 340/447 |
| 5,963,128 A * | 10/1999 | McClelland ................. 340/447 |
| 6,271,748 B1 * | 8/2001 | Derbyshire et al. ......... 340/442 |

FOREIGN PATENT DOCUMENTS

WO    WO 92/14620    9/1992

* cited by examiner

Primary Examiner—John Tweel
(74) Attorney, Agent, or Firm—Sterne, Kessler, Goldstein & Fox, P.L.L.C.

(57) ABSTRACT

A tire condition monitoring system (1) comprises a wheel transmitter unit (2) for each wheel of a vehicle. The transmitter unit is mountable in the wheel and has sensors (9, 10) for sensing pressure and temperature in and rotation of the wheel. Signals from the sensors are processed by a processor (9) to produce data which is transmitted via a radio frequency transmitter (23). The data is transmitted with data representing a unit identity code. Transmitted data is received by a receiver unit (5, 6, 7) where it is analyzed to determine the condition of the tire. The receiver unit includes a user operable input for setting threshold limits for the temperature and/or pressure such that if a threshold is passed an alarm is sounded. Each wheel transmitter unit includes a power supply and is arranged so that power is only applied during the sensing and transmission of data. Intervals between transmissions of data can be varied depending on whether rotation of the wheel has been sensed.

6 Claims, 17 Drawing Sheets

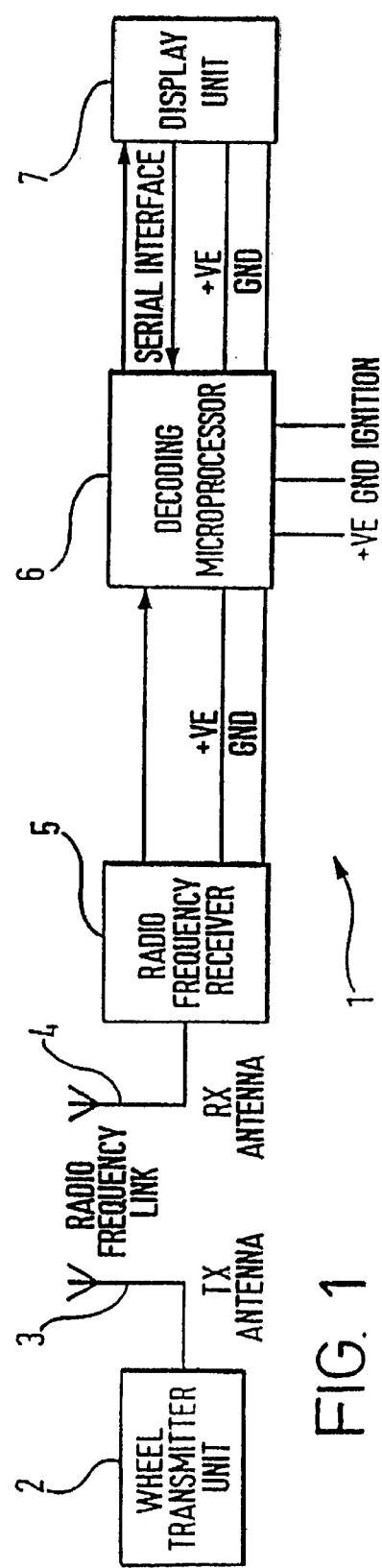
FIG. 1
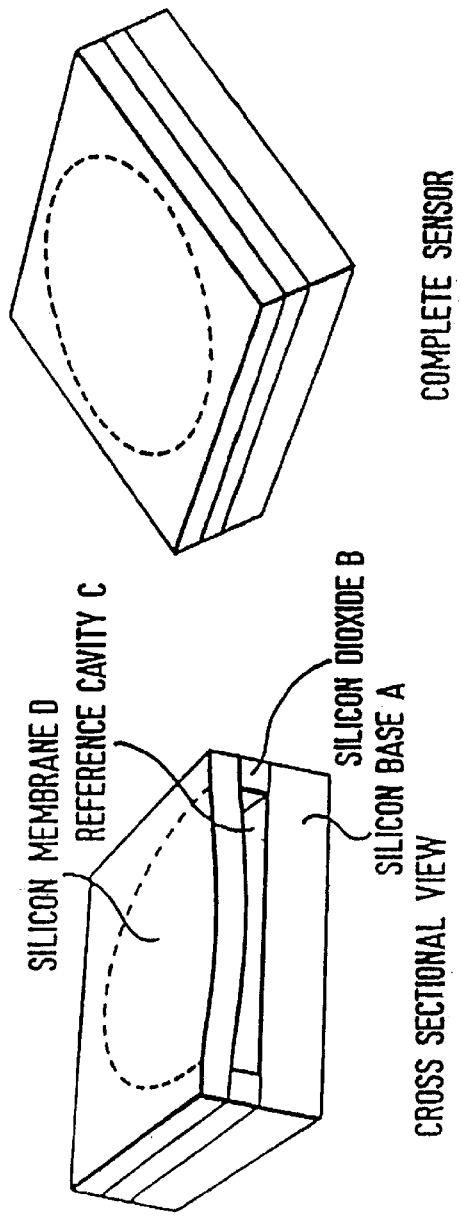
FIG. 3A
CROSS SECTIONAL VIEW
FIG. 3B
COMPLETE SENSOR

TRANSMISSION FORMAT

DATA FORMAT

TIRE CONDITION MONITORING SYSTEM

"This is a divisional application of U.S. patent application Ser. No. 08/793,586, filed Oct. 20, 1997, now U.S. Pat. No 6,271,748 which is a 371 of the international application PCT/GB95/02060, filed Aug. 31, 1995."

The invention relates to a tyre condition monitoring system, to a sensor device, a wheel transmitter unit and a transducer for use therewith, to a method of calibration, and to a transceiver circuit.

BACKGROUND OF THE INVENTION

Tyre condition monitoring systems are used to monitor the condition of tyres on a vehicle in order to increase the safety and efficiency of the vehicle. There has been a great deal of interest in tyre monitoring in the past and some examples of recent proposals are disclosed in U.S. Pat. No. 4,703,650, U.S. Pat. No. 4,737,761, U.S. Pat. No. 4,823,107, U.S. Pat. No. 4,837,553, U.S. Pat. No. 4,843,872, U.S. Pat. No. 4,893,110, U.S. Pat. No. 5,029,468 and U.S. Pat. No. 5,054,315.

In our International Patent Application No. PCT/GB 93/02005 published as WO-A-94/06640 we describe a tyre condition monitoring system comprising a unit mountable in a wheel of a vehicle. The unit comprises a sensor, a voltage controlled oscillator and a code generator arranged such that a coded signal is generated in a time period related to the value of the pressure or temperature sensed by the sensor. In order to conserve power the unit comprises a power supply which is activated by a timer from time to time causing the coded signal to be transmitted. Once the code has been transmitted the power supply is deactivated. The unit further comprises a monitor circuit which continuously monitors the sensor for an unacceptable pressure or temperature condition. An override circuit is responsive to the monitor circuit or to an external stimulus to activate the power supply.

International Patent Application No. PCT/CA 92/00072 published as WO-A-92/14620 describes a tyre monitoring apparatus and method in which a code representing a measured physical quantity, property or condition of a tyre is transmitted. The circuit is operable in an active mode in which a measurement circuit measures an instantaneous value of temperature and pressure and a transmitter circuit transmits a signal representing the sensed instantaneous values of pressure and temperature. In the low power mode minimal power is consumed by the measurement and transmitter circuits.

STATEMENTS OF THE INVENTION

The present invention aims to provide among other things an improved tyre condition monitoring system.

According to one aspect of the invention there is provided a sensor device for sensing parameters associated with a pressurised unit, the sensor device comprising a sensor for sending one or more parameters associated with said pressurised unit, a processor for processing signals from the sensor, and a transmitter for transmitting data, the processor being operable in plural different modes including a calibration mode in which data is recorded for known conditions and in a normal operating mode in which data representing the one or more sensed parameters is transmitted by the transmitter.

According to another aspect of the invention there is provided a wheel transmitter unit for a tyre condition monitoring system, the wheel transmitter unit being mountable to a wheel and comprising a sensor for sensing one or more parameters associated with said wheel, a transmitter for transmitting data representing the sensed one or more parameters, a power supply for supplying power to the sensor and the transmitter, and a condition monitor arranged to respond to operating conditions of the wheel transmitter unit to vary the manner in which the transmitter unit transmits data.

According to a further aspect of the invention there is provided a transducer comprising: a pressure sensor for producing an output proportional to pressure applied thereto; a temperature sensor for producing an output representing the temperature thereof; storing means for storing calibration data representing the behaviour of the pressure sensor in response to both pressure and temperature; and processing means for processing the pressure and temperature sensor outputs with reference to the stored calibration data to produce a calibrated output representing directly the pressure applied to the transducer.

In another aspect the invention provides a tyre condition monitoring system, comprising at least one sensor device or wheel transmitter unit mountable in the wheel of a vehicle; and a receiver unit for receiving the data transmitted by the at least one sensor device or wheel transmitter unit and monitoring the received data, the receiver unit comprising user operable means for selecting one or more thresholds and being responsive to the one or more sensed parameters passing a respective user selected threshold by outputting a warning.

In a further aspect the invention provides a method of calibrating a pressure transducer for temperature-related changes in the output of the transducer, the method comprising: placing the transducer in a calibration chamber at a known temperature; varying the pressure in the chamber to a first pressure; recording data representing the output of the transducer for the first pressure; varying the pressure in the chamber to a second pressure; and recording data representing the output of the transducer for the second pressure.

The invention also provides a tyre condition monitoring system comprising at least one wheel transceiver unit mountable in a wheel of a vehicle; and a central transceiver unit for transmitting commands to the at least one wheel transceiver unit and receiving tyre condition data transmitted in reply to said commands from said wheel transceiver unit.

The invention further provides a transceiver circuit comprising an oscillator circuit for providing a reference frequency signal, a modulating circuit for modulating a data signal representing data to be transmitted with the reference signal and outputting the modulated signal for transmission, a receiver circuit for receiving a modulated data signal which receiver circuit is arranged to receive also signals from the modulating circuit derived from the reference signal, and a demodulating circuit for demodulating the received signal to extract the data therefrom.

The above and further features of the invention are set forth with particularity in the appended claims and together with advantages thereof will become clearer from consideration of the following detailed description of an exemplary embodiments of the invention given with reference with the accompanying drawings.

BRIEF DESCRIPTION OF THE DRAWINGS

In the drawings:

FIG. 1 is a schematic diagram of a first system embodying the invention;

FIG. 3(a) shows a perspective cross sectional view through a capacitive pressure sensor and FIG. 3(b) shows a perspective view of the capacitive pressure sensor;

DETAILED DESCRIPTION OF SYSTEMS EMBODYING THE INVENTION

General Overview of a First System

Figure 2:
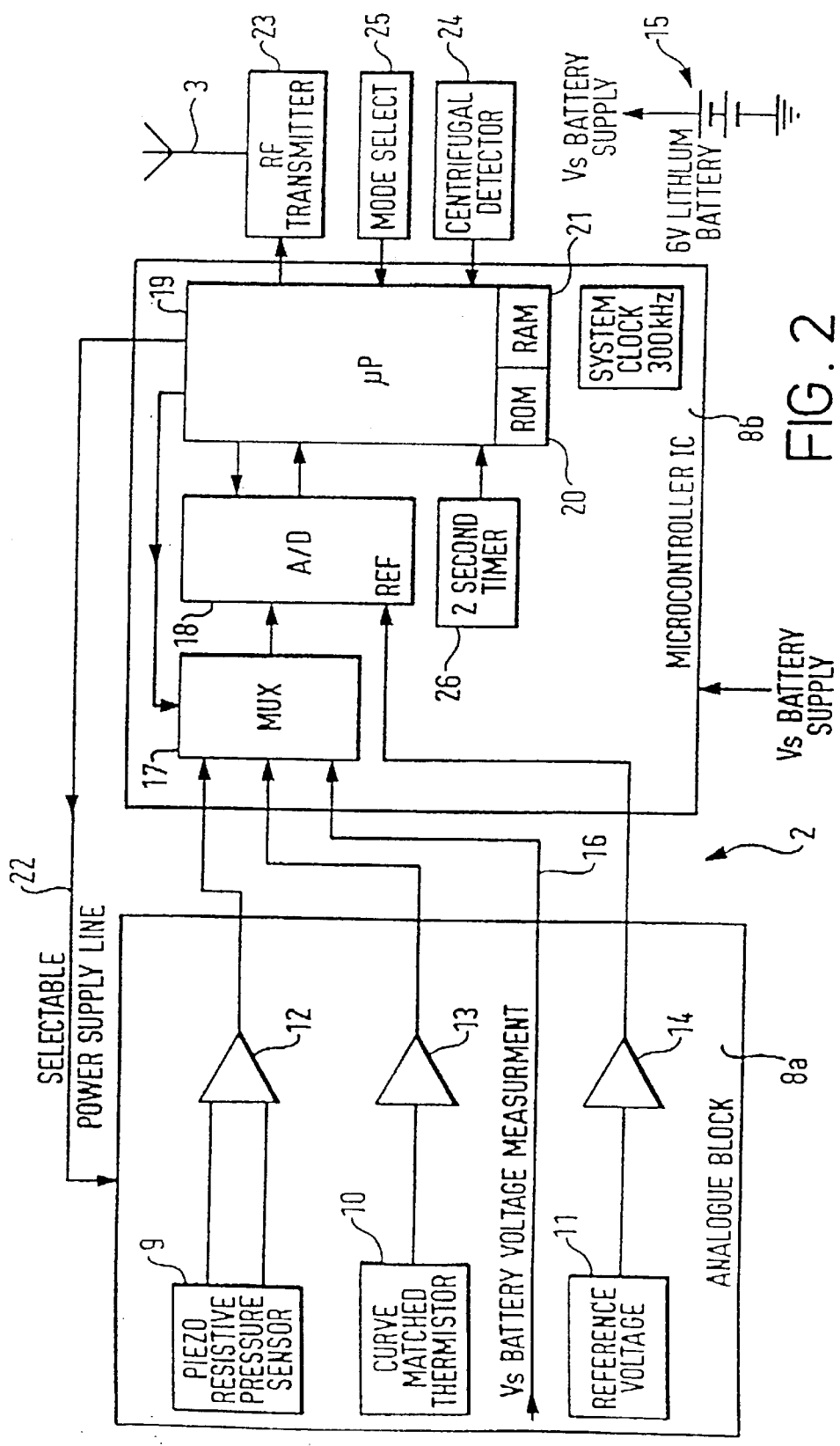
FIG. 2 shows in greater detail circuitry associated with a wheel transmitter unit.

Referring now to FIG. 1 of the accompanying drawings there is shown a schematic diagram of a system 1 embodying the invention. The system 1 comprises a wheel transmitter unit 2 and associated transmitting antenna 3 mountable in the wheel of a vehicle. It is envisaged that in practice the system will comprise a wheel transmitter unit for each wheel of the vehicle, including any spare wheels provided in the vehicle. The system further comprises a receiving antenna 4 which conveniently is a folded dipole printed on a circuit board mountable behind the dashboard of the vehicle for example. Signals from the receiving antenna 4 are input to a radio frequency receiver which also is mountable behind the dashboard and which serves to condition the signals for input to a decoding microprocessor 6.

The decoding microprocessor 6 processes the signals input thereto in order to determine what information (e.g. temperature or pressure) has been transmitted from which wheel transmitter unit. The decoding microprocessor unit 6 generates signals for driving a display unit 7 so as to provide on the display unit 7 an indication of the status of each of the wheels. Together the antenna 4, the receiver 5, the microprocessor 6, and the display 7 form a unit which will be referred to hereinafter as the receiver unit.

It should be noted that whilst the radio frequency receiver 5, the decoding microprocessor 6 and the display unit 7 are shown as separate functional units, they may in fact be combined in a single housing at a convenient location behind or in the dashboard of a vehicle. For example, it may be convenient to combine the radio frequency receiver 5 and the decoding microprocessor 6 in a single unit housed behind the dashboard, to provide the receiving antenna on a separate board and to provide the display unit mounted on the dashboard. Alternatively, it may be convenient to provide a single radio unit comprising the antenna circuit board and the radio frequency receiver, and to provide a separate processing and display unit comprising the decoding microprocessor 6 and display unit 7. These implementation details are well within the scope of those possessed of the appropriate skills and will not be discussed in any further detail herein.

Wheel Transmitter Unit

Turning now to FIG. 2 of the accompanying drawings there is shown in greater detail circuitry associated with the wheel transmitter unit 2. Each wheel transmitter unit 2 comprises an analog circuit 8a and a digital circuit 8b. The analog circuit 8a comprises a pressure sensor 9, a thermistor 10 and a reference voltage unit 11.

Piezoresistive pressure sensors are widely available but are not well suited for use within a tyre because in use a significant current must pass through the resistive elements so that a pressure dependent voltage can be measured. Consequently, such sensors consume a relatively large amount of power making them unsuitable for long term use within a tyre. Another disadvantage of piezoresistive sensors is that they exhibit a large temperature coefficient. This results from mechanical strain caused by the difference in expansion coefficients of the silicon membrane and the supporting substrate of the sensor.

FIGS. 3(a) and (b) show a pressure sensor comprising a silicon base A supporting a layer of silicon dioxide B defining a reference cavity C, and a silicon membrane D. A vacuum is formed in the cavity C. Because the silicon dioxide layer B is an excellent insulator, the silicon layers A and D form a capacitance. The upper silicon membrane thickness is chosen to exhibit a suitably large deflection upon the application of external pressure. However, the deflection must not be so large as to cause fracture or physical contact between the two silicon layers.

As the silicon membrane D is deflected closer to the silicon base A, the capacitance between the two layers increases. The sensor exhibits a near-linear capacitance change with applied pressure with a very low intrinsic temperature coefficient. If the response of the sensor is plotted, it can be seen that the capacitance change is superimposed on an offset capacitance of around 70 pF. The capacitance increases by about 20 pF with an applied pressure of 10 Bar.

The physical dimensions of the sensor make it particularly suitable for the tyre monitoring system, the sensor is smaller than 4 mm square before packaging.

The thermistor is preferably a curve matched device because such devices are of known accuracy (±0.2° C. is acceptable) thereby obviating the need to calibrate each wheel transmitter unit for temperature.

The reference voltage unit 11 comprises a precision band gap reference device (not shown) which provides a reference voltage output to a tight tolerance regardless of any changes in the voltage supplied thereto. Signals from the pressure sensor 9, thermistor 10 and reference voltage unit 11 are output via respective amplifiers 12 to 14 to the digital circuit 8b.

Power for the wheel transmitter unit 2 is provided by a battery 15. A signal corresponding to the battery voltage is input via line 16 to the digital circuit 8b. The analog circuit 8a, may be provided in a single ASIC. Among other things this offers the advantage of being able to manage simply the supply of power to the whole of the analog circuit 8a, thereby reducing the power consumed by the unit 2 as a whole when temperature, pressure and reference voltage signals are not required for processing by the digital circuit 8b.

The digital circuit 8b comprises a multiplexer 17, an analog to digital converter 18 and a microprocessor 19 with associated read only and random access memories (ROM and RAM) 20, 21. The pressure signal from the amplifier 12, the temperature signal from amplifier 13 and the battery voltage signal on line 16 are each input to the multiplexer 17. Under the control of the microprocessor 19, the multiplexer 17 selects each of the signals in turn and outputs the selected signal to the analog to digital converter 18.

The reference voltage from amplifier 14 is also input to the analog to digital converter 18 and provides a reference against which the pressure, temperature and battery signals are converted into digital form. (The reference voltage is defined to a tight tolerance in order to ensure accuracy of this conversion.) The reference voltage signal serves to define the maximum voltage which can be converted into digital form by the analog to digital converter 17. Thus, a reference voltage of 3 volts would define a voltage conversion range from 0 to 3 volts and thus a signal of 3 volts input from the multiplexer would be converted to a digital value of say 256, an input signal of 1.5 volts would be converted to a digital value of 128, and an input voltage of 0.75 volts would be converted to a digital value of 64. Data from the analog to digital converter 18 is input to the micro-processor 19 where it is processed.

Wheel Unit Operating Modes

The digital circuit 8b is preferably provided as a single microcontroller chip such as the PUNCH™ microcontroller by CSEM or the PIC™ microcontroller by Arizona Microchip. Both of these proprietary devices comprises a microprocessor with associated ROM, RAM, multiplexer, analog to digital converter, etc. on a single chip. These devices are also operable in a standby or "sleep" mode in which power is removed from nearly all of the chip thereby reducing the power consumed when there are no temperature or pressure signals that require processing. As the digital circuit 8b enters the sleep mode a signal is generated by the microprocessor 19 and output via line 22 to the analog circuit 8a causing power to be removed from the analog circuit 8a.

The wheel transmitter unit 2 also comprises a radio frequency transmitter 23 which receives encoded data from the microprocessor 19 for transmission. Also, a centrifugal detector 24 provides directly to the microprocessor 19 a signal indicative of centrifugal force. This signal provides for the microprocessor 19 an indication that the wheel is rotating (and therefore the vehicle to which the wheel is connected is in use). A mode selector 25 also provides a signal directly to the microprocessor for controlling the manner or mode in which the microprocessor functions. The mode selector 25 may be an induction device (for example similar to that described in WO-A-94/06640) which produces control signals for the microprocessor in response to an electromagnetic field being applied thereto.

The wheel transmitter unit 2 is operable in three different modes, namely a calibration mode, a remote excitation mode and a normal operating mode. Program data controlling the operation of the microprocessor 19 in each of these operating modes is stored in the ROM 20.

Calibration Mode

Figure 4:
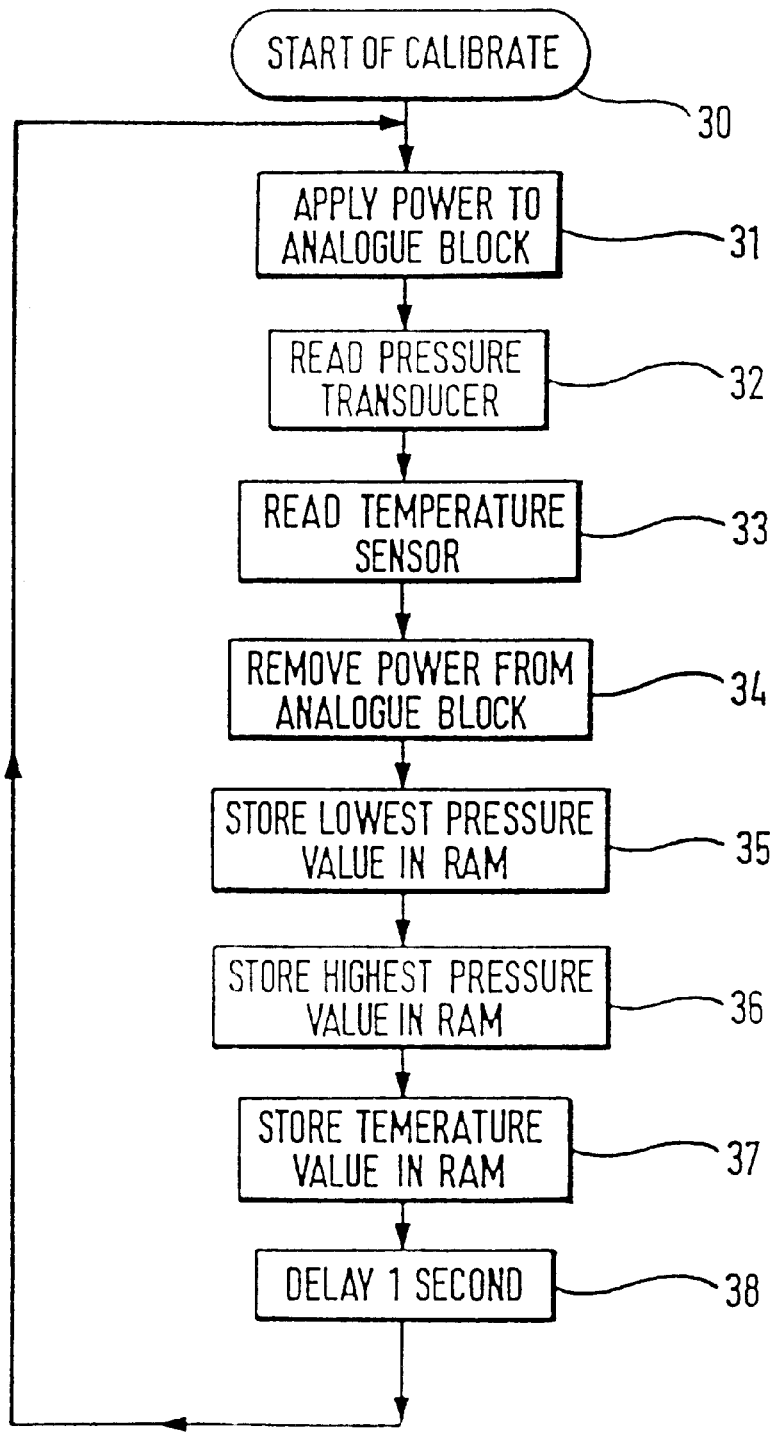
FIG. 4 is a flow diagram representing a calibration operating mode.

The calibration mode is represented by the flow diagram in FIG. 4 of the accompanying drawings. The calibration mode is entered prior to installation of the wheel transmitter unit in the wheel of a vehicle. The transmitter unit is placed in a test chamber in which it is exposed to calibrated pressures. The requirements of the calibration are, naturally, dependent on the vehicle in which the unit is to be installed. However, for the majority of applications it is sufficient to expose the transmitter unit to two calibrated pressures in the test chamber, namely 0 psi and 60 psi at approximately room temperature.

Referring now to FIG. 4, the calibration mode is entered at step 30 and at step 31 the microprocessor 19 applies power via line 22 to the analog circuit 8a. Next, the pressure signal from amplifier 12 is multiplexed into the analog to digital converter and the digital signal representative thereof is held by the microprocessor 19. This operation is represented by the step 32 in FIG. 4. Next, at step 33 the temperature signal from the amplifier 13 is multiplexed in to the analog to digital converter, and the resulting digital value is held by the microprocessor. The microprocessor now has all the data that it requires for calibration and therefore in step 34 the microprocessor causes the power to be removed from the analog circuit.

Depending on the pressure in the calibration chamber, either the low pressure value is stored in the RAM 21 in step 35 or the high pressure value is stored in the RAM in step 36. Also, the temperature value is stored in the RAM 21 at step 37. The system then pauses for one second, as represented by step 38, and the calibration sequence is then re-entered by the microprocessor at step 31. The calibration sequence is repeated for the duration of the calibration test so that at the end of the test the RAM contains data representing the lowest and highest pressures sensed by the pressure sensor 9 and the temperature sensed by the thermistor 10.

Data representing the output from the pressure sensor 9 and the thermistor 10 is thus stored by the microprocessor 19 as calibration constants in the RAM 21. This data remains in the RAM 21 for the lifetime of the battery 15. Also, the ROM contains a 24-bit code which identifies the wheel unit. A 24-bit code provides over 16 million different code combinations and therefore enables each wheel unit to have its own unique identity. The 24-bit code is programmed into the ROM during the manufacture of the wheel unit and remains with the wheel unit for the whole of its life. As will be explained in greater detail hereinafter, the identity code is transmitted with the wheel parameter data (pressure and temperature) in order to enable the receiver unit to identify to which wheel the received parameters relate.

Remote Excitation Mode

Figure 5:
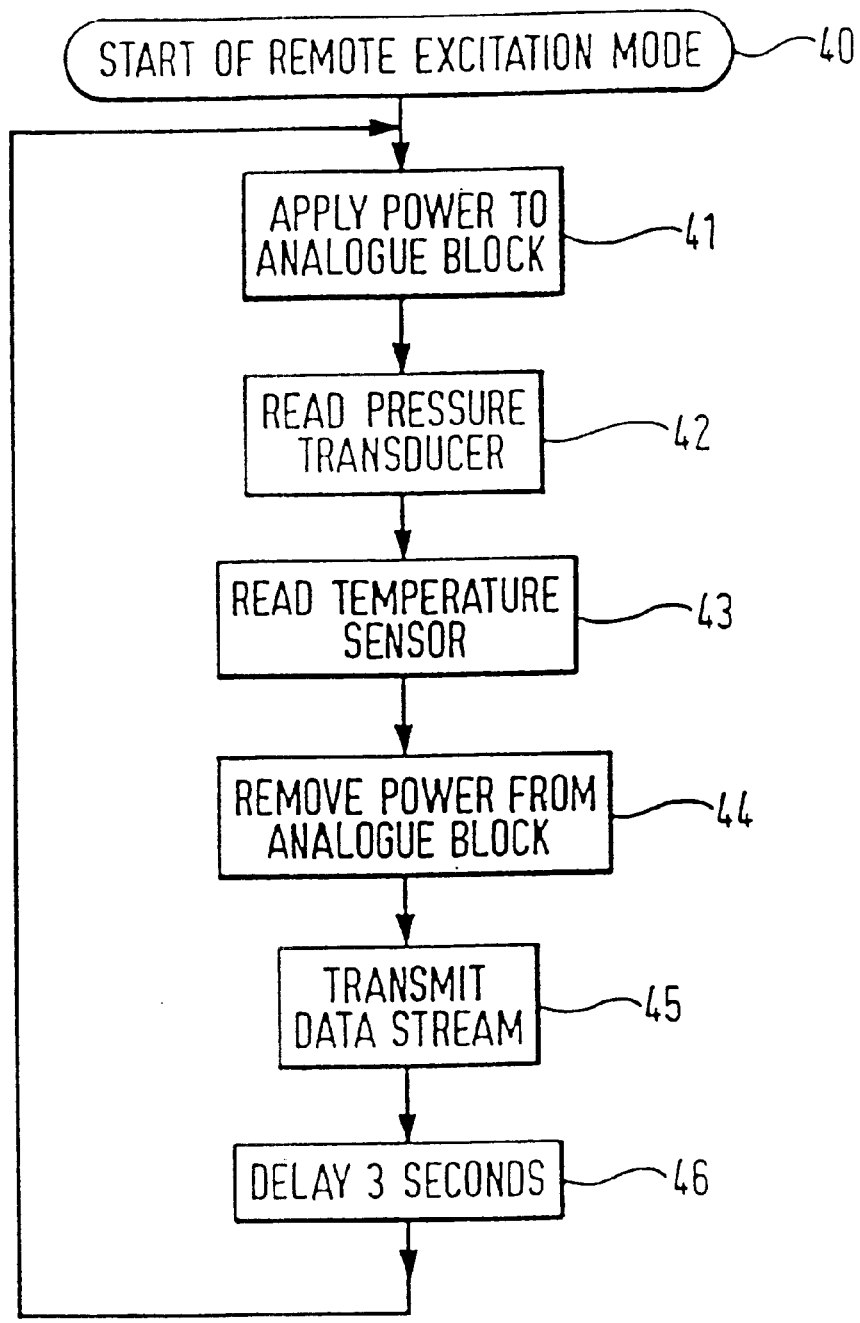
FIG. 5 is a flow diagram representing a remote excitation operating mode.

The remote excitation or installation mode is represented by the flow diagram in FIG. 5 of the accompanying drawings. The remote excitation mode is a special mode that causes all of the calibration constants data and data representing the present outputs from the sensor 9 and thermistor 10 to be transmitted immediately on entry into the mode and then again every three seconds whilst still in this mode. The remote excitation mode is used during installation of a system or during reinstallation of part of the system following for example a power supply failure in a wheel unit or the receiver unit.

Referring now to FIG. 5, following entry into the remote excitation or installation mode at step 40, power is applied to the analog circuit at step 41. The signals from the amplifiers 12 and 13 pertaining to the pressure and temperature sensed by the pressure sensor 9 and thermistor 10 are converted into digital form and held by the microprocessor 19 at steps 42 and 43. Then at step 44 power is removed from the analog circuit. Next, the microprocessor outputs data to the RF transmitter 23 for transmission thereby. This transmission is represented by the step 45 in FIG. 5. In step 46 the processor waits for three seconds before returning to the beginning of the excitation mode process by again applying power to the analog block at step 41.

The remote excitation mode is used during vehicle installation to enable the radio frequency receiver 5 and decoding microprocessor 6 (see FIG. 1) to record the calibration constants associated with each transmitter. The calibration constants are used subsequently by the receiver to calculate accurate pressure values from the data transmitted from each wheel transmitting unit. The wheel transmitter unit 2 can be placed in to this remote excitation mode by way of the mode selector 24 at any time where an update of the data associated with the wheel transmitter is required.

Normal Operating Mode

Figure 6I:
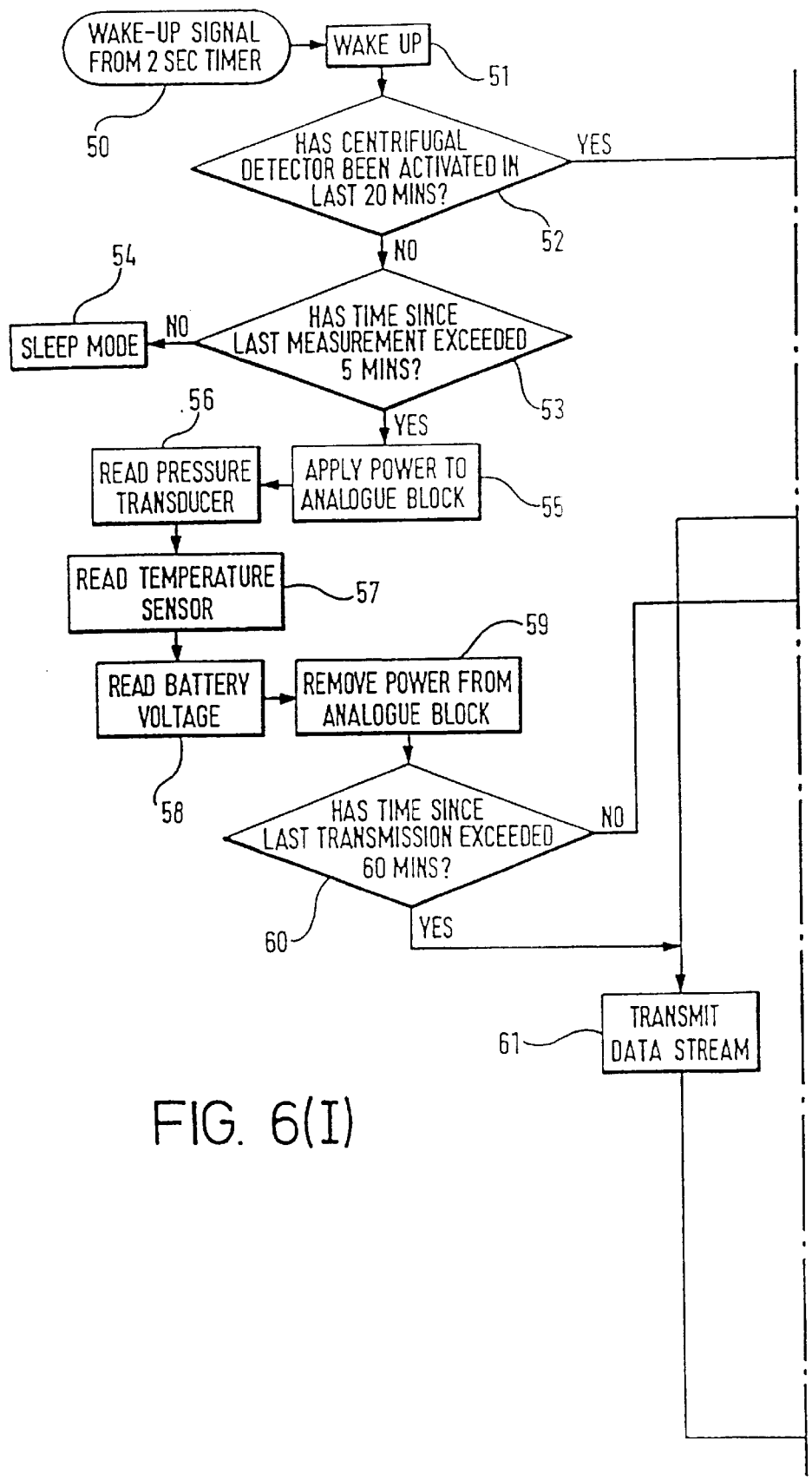
FIG. 6 is a flow diagram representing a normal operating mode.
Figure 6:
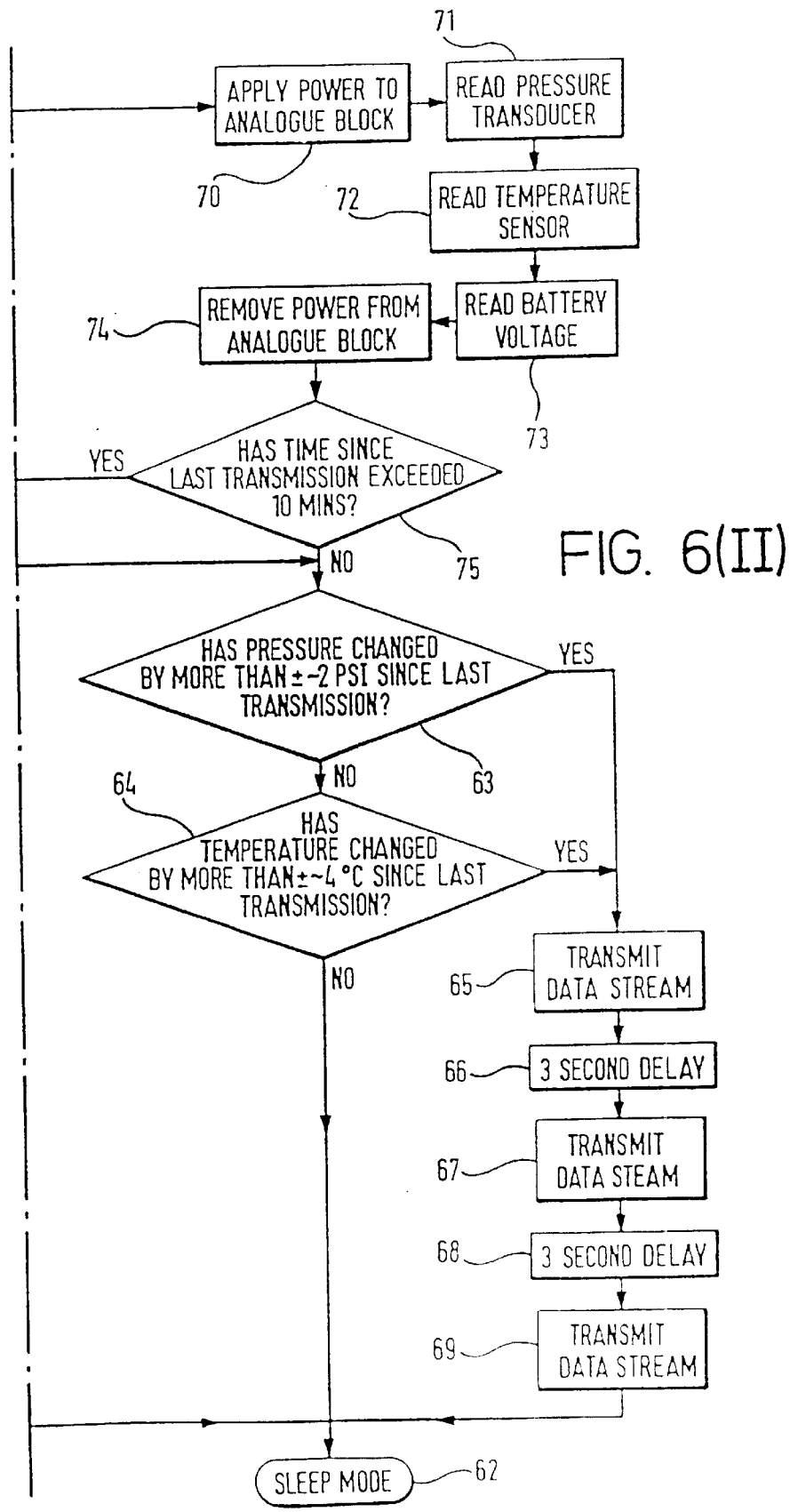

The normal operating mode is represented by the flow diagram in FIG. 6 of the accompanying drawings. The wheel transmitter unit 2 operates in the normal operating mode the majority of the time. In this mode the microprocessor 19 determines whether or not the vehicle is in use by way of the signal from the centrifugal detector 23. When the vehicle is in use the pressure signal from the amplifier 12 and the temperature signal from the amplifier 13 are sampled every two seconds and depending on the values of the sampled data a decision is made as to whether or not the data should be transmitted. When the vehicle is in use the wheel transmitter unit 2 is arranged so that data is transmitted at least every ten minutes and also more frequently if there has been a significant change in the data since the previous transmission. When the vehicle is not in use the rate at which the pressure and temperature signals are sampled is reduced to once every five minutes. The minimum time between transmission is increased to sixty minutes. This reduces the power consumption of the wheel transmitter unit to about one fifth of the consumption when the vehicle is in use.

The digital circuit includes a timer 26 which functions regardless of whether the transmitter unit 2 is in "standby" mode or operation mode. Referring now to FIG. 6, as represented by step 50 at convenient intervals, for example every two seconds, the timer 26 outputs a wake-up signal to the microprocessor. The microprocessor responds to the wake-up signal by coming out of its standby mode in step 51. Next, in step 52 the microprocessor 19 determines whether it has received an active signal from the centrifugal detector 24 in the last twenty minutes. If no such signal has been received, this indicates that the vehicle is not in use, and the microprocessor therefore enters step 52 where it determines whether the time since the last measurement was taken has exceeded five minutes. If the time since the last measurement is less than five minutes the microprocessor returns to the sleep mode at step 54 until such time as another wake-up signal is received from the timer 26. If, however, the time since the last measurement exceeds five minutes, then power is applied to the analog circuit in step 55, and in steps 56, 57 and 58 respectively the signals from the pressure sensor 9, the thermistor 10 and the signal representing the battery voltage are input to the digital circuit 8b where they are digitised. The resulting digital data is held by the microprocessor 19 in the RAM 21. Power is then removed from the analog circuit 8a in step 59.

When the vehicle is not in use, there is no need to transmit data at closely spaced intervals. In order to maintain communication between the various wheel transmitter units 2 and the receiver and processing circuitry, data is transmitted from each wheel transmitter unit once every hour unless there has been a dramatic change in pressure or temperature since these parameters were last transmitted. Thus, at step 60 the microprocessor 19 determines whether the time since the last transmission is greater than sixty minutes.

If the time is greater than sixty minutes then the data representing the sensed pressure and temperature is transmitted by the RF transmitter 23 in step 61. The transmitter unit 2 then re-enters the sleep mode at step 62 until another wake-up signal is received from the timer 26 in step 50. If, however, the time since the last transmission is less than sixty minutes, the microprocessor determines at step 63 whether the sensed pressure has changed by more than ±2 psi since the previous transmission and at step 64 whether the temperature has changed by more than ±4° C. since the previous transmission. If neither pressure nor temperature have changed, then the wheel transmitter unit re-enters the sleep mode at step 62. If either the pressure or the temperature has changed by more than the preset limits of ±2 psi or ±4° C., then in steps 65 to 69 the RF transmitter 23 transmits a data stream representing the sensed pressure and temperature. The data stream is transmitted three times with a three second delay being inserted between each transmission, because this significantly increases the probability that the data will be received in a retrievable form by the receiver unit. For example if there is a 90% chance that a single data transmission is received correctly, then a triple transmission has a 99.9% chance of being correctly received. Once the data stream has been transmitted three times the wheel transmitter unit 2 again enters the sleep mode at step 62.

If the centrifugal detector has been activated within the last twenty minutes then this indicates that the vehicle either is or has recently been in use. Power is therefore applied immediately to the analog circuit at step 70 and the signals from the pressure transducer, the temperature transducer and representing the battery voltage are read at step 71, 72 and 73 respectively. Once digital data pertaining to the pressure, temperature and battery voltage has been stored in the RAM 21 by the microprocessor 19, power is removed from the analog circuit by the microprocessor via line 22 during step 74. Regardless of the values of the sensed pressure and temperature, the microprocessor 19 determines in step 75 whether data has been transmitted within the last ten minutes. If the time since the last data transmission exceeds ten minutes then the data is transmitted in step 61 and thereafter the wheel transmitter unit 2 returns to the sleep mode at step 62. If, however, there has been a transmission of data within the last ten minutes the values of the sensed pressure and temperature are examined by the microprocessor 19 to determine whether there has been a pressure or temperature change of more than in the preset limits of ±2 psi or ±4° C. in steps 63 and 64 respectively. As previously described hereinabove, if either sensed parameter has changed by more than the predetermined amount then a data stream representing the sensed parameters is transmitted three times with a three second delay between each transmission at steps 65 to 69, and the transmitter unit then returns to the sleep mode 62. Otherwise, the transmitter unit returns directly to the sleep mode 62.

Although not shown in the drawings, the microprocessor is programmed to examine the data relating to the battery voltage level on receipt of that data. If the battery voltage level is less than a predetermined value, then the pressure and temperature data is not transmitted from the wheel transmitter unit 2. Instead, data indicating a low battery voltage level is transmitted causing the receiver to output a warning.

Data Encoding and Transmission

Before the data is transmitted from the wheel unit 2, it is encoded. In order to reduce the possibility of data corruption during transmission, the data is convolved. The temperature and pressure data is stored in the RAM 21 as an 8-bit word and is convolved to produce a 32-bit data field which is transmitted by the radio frequency transmitter. The method of convolution used in the wheel transmitter unit 2 is represented by the functional diagram in FIG. 7 of the accompanying drawings.

Figure 7:
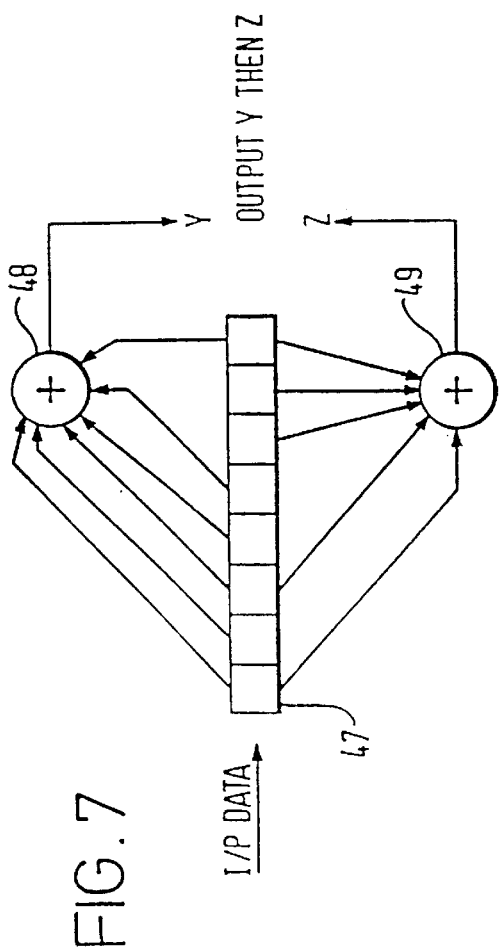
FIG. 7 is a functional diagram representing convolution used in the wheel transmitter unit.

Referring now to FIG. 7, an 8-bit shift register 47 is initially cleared so that all bits are set to logic zero. The 8-bit data to be transmitted is then shifted into the register from the left (most significant bit first). At each shift the contents of the register are output to two summers 48, 49 which produce outputs Y and Z respectively. If, for example the register 47 contains the 8-bit word 10010001 then the output from summer 48 is Y=1 and the output from summer 49 is Z=0. At each shift, the output is made up of the value Y followed by the value Z. Once all 8 bits of data have been shifted in to the register 47, the register is then cleared by shifting in zeros from the left. In this way, an 8-bit word input to the shift register 47 is converted to a 32-bit data field output from the summers 48, 49.

Data Transmission

The data fields thus created are transmitted as a data stream by the radio frequency transmitter 23 using a Manchester coding method. This coding technique is per se well known. At the beginning of a transmission a reference clock signal is first transmitted in order to overcome difficulties in timing the received data resulting from differences caused by tolerance variations in the source transmission frequency. The Manchester coded data fields are then transmitted on a bit-wise basis simply by using the code as an on-off key to energise and de-energise the RF transmitter 23.

Using the data in the data stream as an on-off key for the radio frequency transmitter 23 ensures that the transmitter only has power applied to it when there is data to be transmitted.

Figure 8:
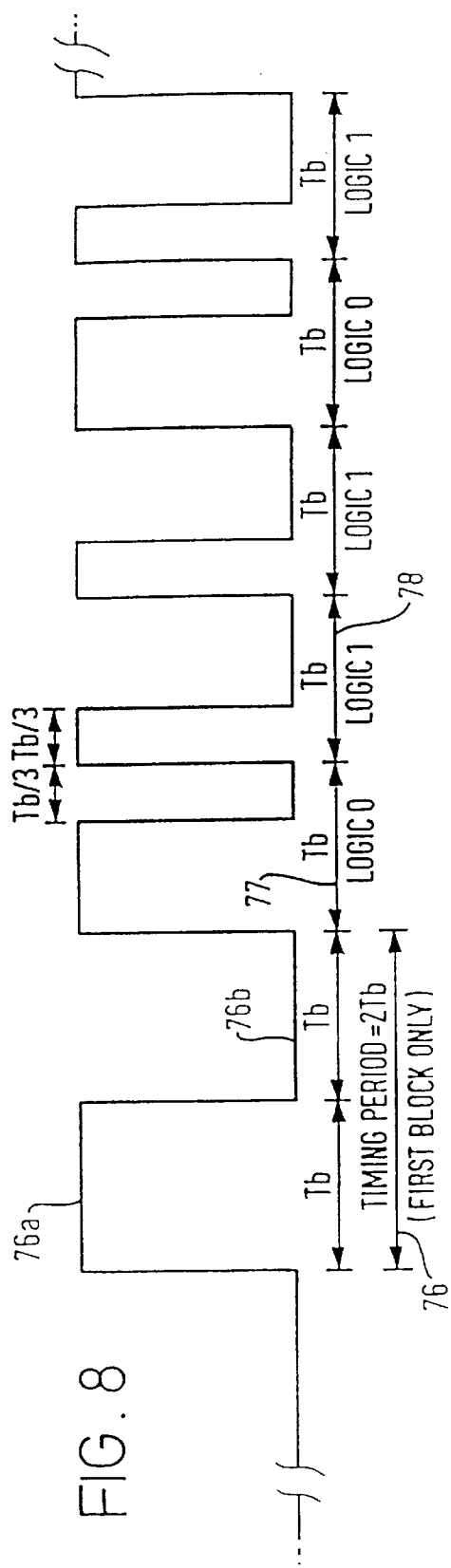
FIG. 8 is a signal diagram showing an example of data encoded using a Manchester coding technique.

FIG. 8 of the accompanying drawings shows an example of data encoded using the Manchester coding technique. Referring to FIG. 8 the data stream comprises a timing period 76 in which a high signal 76a of duration Tb is transmitted followed by a low signal 76b also of duration Tb. Next, a data bit of logic zero is transmitted in a period 77 of duration Tb. The signal transmitted in time period 77 has a mark-space ratio of $2/3$. Next, in time period 78 of duration Tb a signal having a mark-space ratio of $1/3$ is transmitted representing logic 1. All of the data in each of the data fields is transmitted in this manner.

The data which is to be transmitted by the RF transmitter depends on the mode in which the wheel transmitter unit is operating. No data is transmitted when the wheel transmitter unit is operating in the calibration mode.

Figure 9:
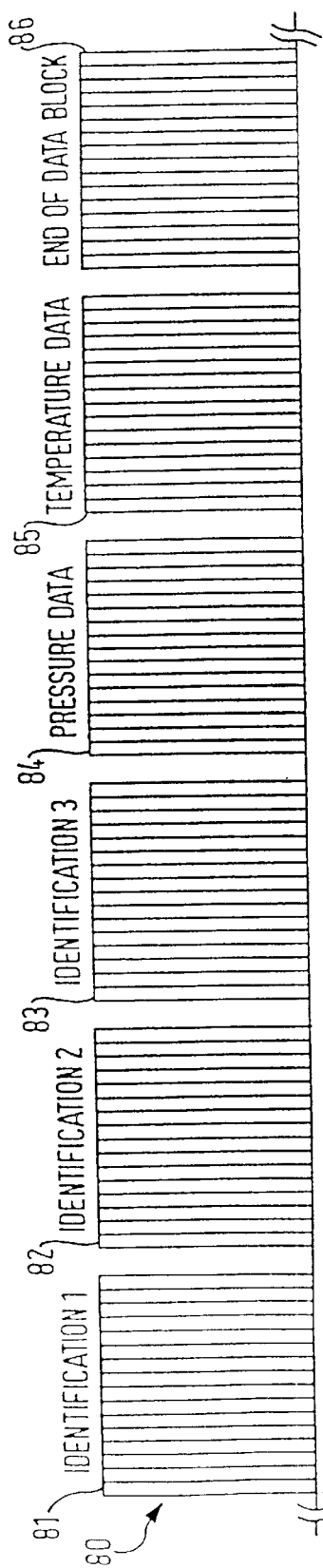
FIG. 9 is a signal diagram showing a data stream transmitted in the normal operating mode.

In the normal operating mode a data stream, such as shown in FIG. 9 of the accompanying drawings, is transmitted. Referring now to FIG. 9, the normal mode data stream 80 comprises three identification fields 81, 82 and 83. Each wheel transmitter unit is given a unique 24-bit identification code during manufacture of the unit before the unit is installed in the wheel of a vehicle. The identification code is divided into three 8-bit words which are convolved separately for transmission as a respective 32-bit field. The transmission of the identification code is followed by the transmission of a 32-bit field 84 representing the convolved pressure data and then a 32-bit field 85 representing the convolved temperature data. In the event that the battery voltage level is detected as being low then the pressure and temperature data are both set to maximum (all bits at logic 1). Finally, an end of data field 86 is transmitted containing a code indicating that the end of the data stream has been reached.

Figure 10:
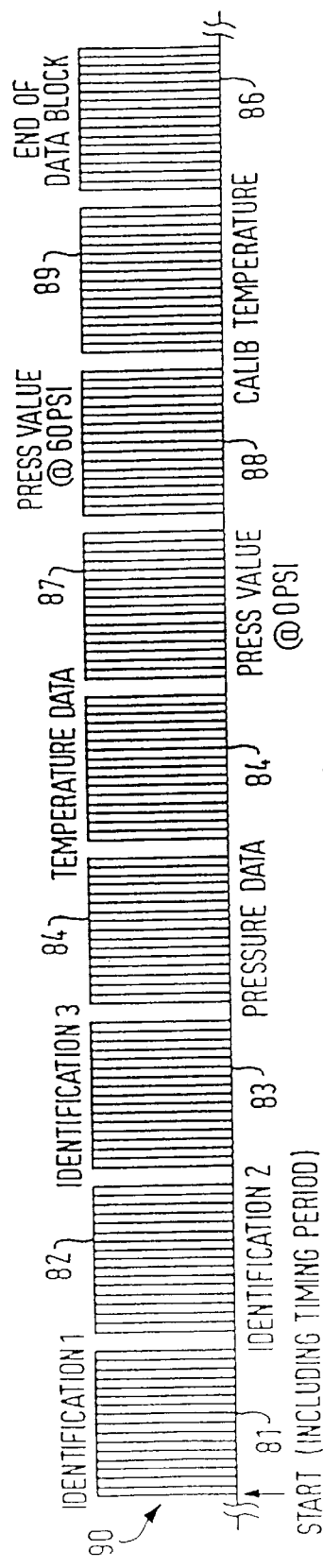
FIG. 10 is a signal diagram of a data stream transmitted in the remote excitation mode.

In the remote excitation mode a longer stream of data is transmitted as shown in FIG. 10 of the accompanying drawings. Referring now to FIG. 10 the remote excitation data stream 90 comprises three identification fields 81, 82 and 83 corresponding to the like-numbered identification fields shown in FIG. 8. The transmission of the three identification fields 81, 82, 83 is followed by the transmission of a pressure data field 84 and temperature data field 85, again corresponding to like-numbered fields shown-in FIG. 8. Next, a data field 87 is transmitted containing data representing the pressure value data for 0 psi obtained when in the calibration mode. Then, a data field is output representing the pressure value data for 60 psi obtained whilst in the calibration mode. Transmission of a data field 89 representing the calibration temperature data obtained during the calibration mode follows the pressure value data field 88. Finally, an end of data field 86 is transmitted to signify the end of the data stream.

Alternative Calibration and Normal Operating Modes

The above described calibration mode is entered by way of an instructing input to the microcontroller and data representing the highest and lowest sensed temperature and pressure are stored in RAM on command. Whilst this procedure is entirely acceptable in a research and development environment, it does not adopt well to mass production of wheel units because it requires the input of an external stimulus to each wheel unit during calibration.

In order to enable mass calibration of a large number of wheel units simultaneously, in an alternative arrangement the micro-controller is programmed to enter automatically a calibration mode when power is first applied to the unit following its manufacture. The microcontroller is arranged to cause an LED (not shown) to flash while the unit is in the calibration mode. The flashing LED enables uncalibrated units to be easily identified. As will be explained in the following, the LED is switched off at the end of the calibration process, thereby enabling ready identification of units which have not been successfully calibrated.

Figure 11:
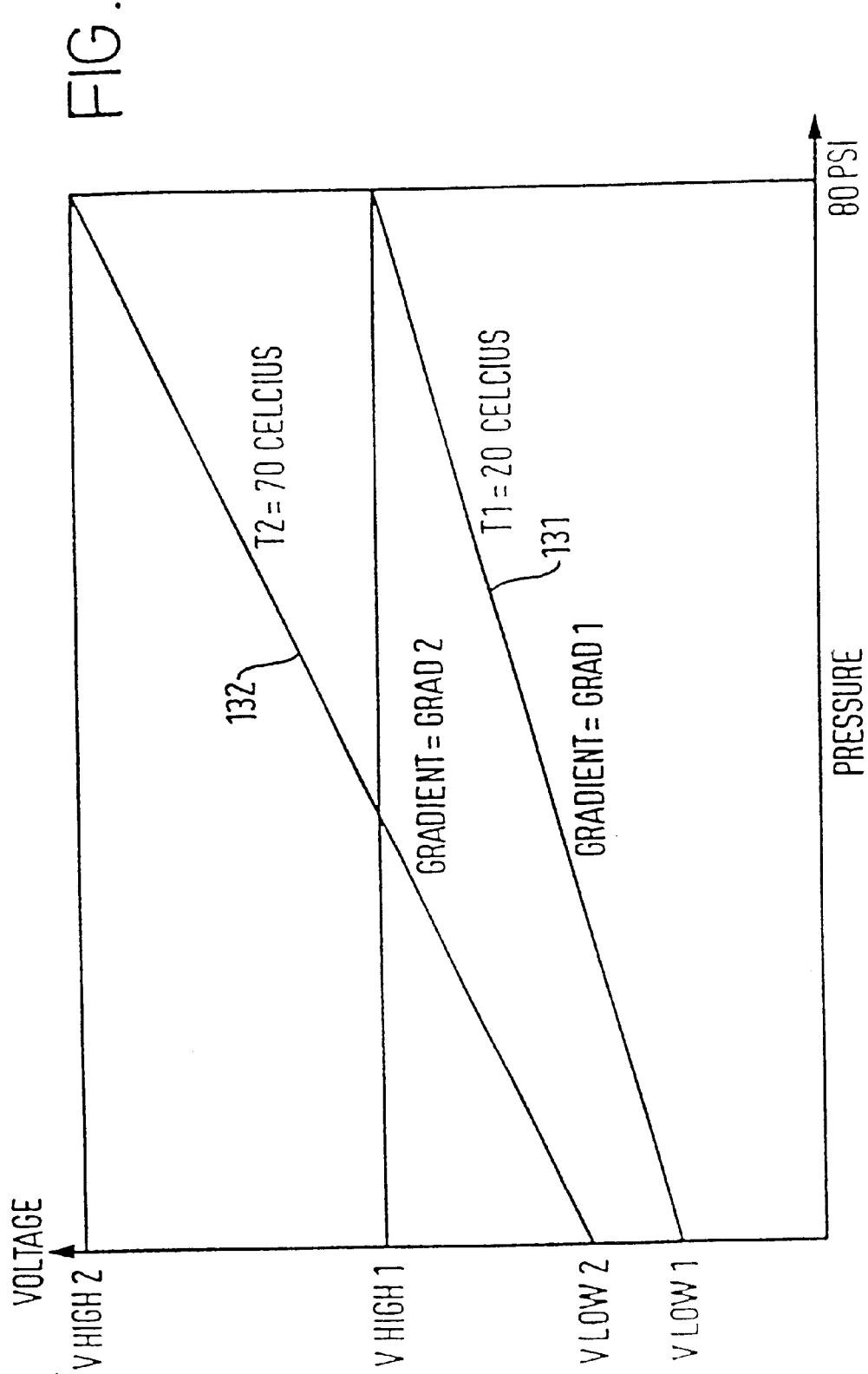
FIG. 11 is a graph representing variations in the output of the pressure sensor with pressure and temperature.

The fact that the thermistor in the wheel unit gives a known output for a given temperature avoids the need to calibrate for temperature and can be used in the calibration of pressure sensing by the wheel unit because the output from the thermistor can be used directly to determine when a predetermined temperature is reached. FIG. 11 of the accompanying drawings shows how the output of the pressure sensor 9 varies with both pressure and temperature. In the following, references to pressure value are references to pressure above atmospheric pressure which is assumed to be 15 psi because it is pressure above atmospheric that is specified for tyres. At a temperature of 20° C. the pressure sensor will produce an output, having the characteristics represented by the line 131, i.e. having a voltage $V_{low1}$ at 0 psi, a voltage $V_{high1}$ at 80 psi, and a gradient Grad1. At a temperature of 70° C. the pressure sensor will produce an output, having the characteristics represented by the line 132, i.e. having a voltage $V_{low2}$ at 0 psi, a voltage $V_{high2}$ at 80 psi and a gradient Grad2. If $V_{low1}$ $V_{low2}$, $V_{high1}$, $V_{high2}$, Grad1 and Grad2 are known and the actual temperature of the sensor can be determined (which it can, by way of the thermistor), then it is possible to determine what pressure is represented by a given voltage output. For temperatures between 20° C. and 70° C. the pressure represented by the output voltage can be determined by interpolation between the two lines 131 and 132, and for temperatures outside the 20° C. to 70° C. range, the pressure can be determined by extrapolation.

Figure 12:
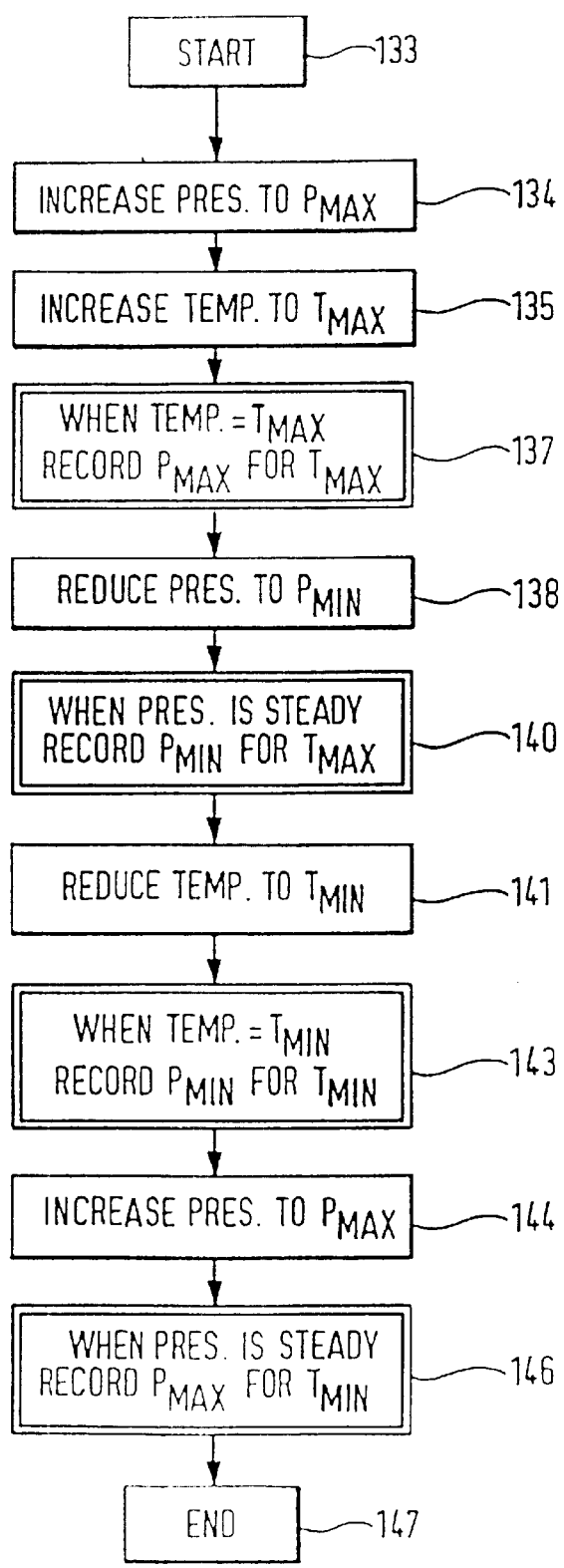
FIG. 12 is a flow diagram of a sensor calibration procedure.
Figure 13:
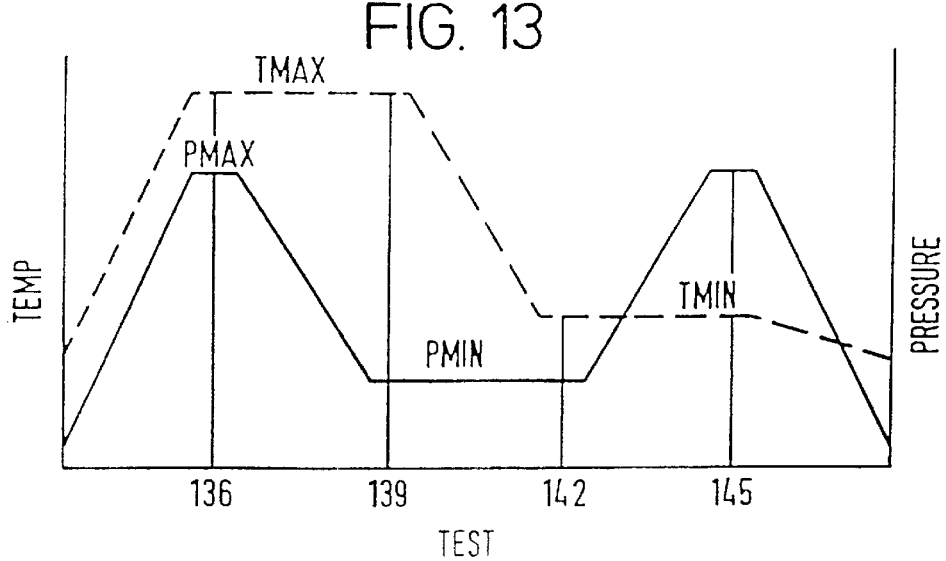
FIG. 13 is a graph representing variations in temperature and pressure applied to the sensor during the calibration procedure.

Values for $V_{low1}$, $V_{low2}$, $V_{high1}$, and $V_{high2}$ may be determined by the calibration procedure represented by FIGS. 12 and 13 of the accompanying drawings.

The calibration procedure is started in step 133 of FIG. 12 upon completion of the manufacture of the wheel unit, once the power supply (battery) has been installed therein. The completed wheel unit, supplied operating in the calibration mode, is placed together with other similar wheel units in a pressure/temperature chamber. The pressure in the pressure chamber is first raised to a maximum value ($P_{MAX}$) of 80 psi for example in step 134. Then the temperature in the chamber is increased to a maximum value ($T_{MAX}$) of say 70° C. in step 135. The pressure is increased to $P_{MAX}$ before the temperature is raised. The arrival of the temperature at the $T_{MAX}$ value is detected by the micro-controller monitoring the output from the curve matched thermistor and is interpreted as indicating that the output from the pressure sensor represents the value $P_{MAX}$ at the temperature $T_{MAX}$. This condition is shown at line 136 in FIG. 13. The pressure sensor output corresponds to the voltage $V_{high2}$ in FIG. 11 and is stored as a value by the microcontroller in the RAM 21 at step 137 in FIG. 12.

Pressure and temperature within the chamber are maintained at $P_{MAX}$ and $T_{MAX}$ for a short period of time (say 1 minute) to ensure that the microcontroller has had sufficient time to store the value corresponding to $V_{high2}$ in the RAM. Then the pressure in the chamber is reduced to a minimum value ($P_{MIN}$) in step 138. In practice, a value of greater than 0 psi is chosen, say 5 psi, because this avoids uncertainties in pressure caused by changes in atmospheric conditions that would arise if the chamber were simply vented to atmosphere. The micro-controller monitors the output from the pressure sensor for the condition shown at line 139 in FIG. 13. The microcontroller responds to the output of the pressure sensor falling and then reaching a steady value by storing a value representing the output voltage in the RAM. This is represented by step 140 in FIG. 12. The value stored in the RAM corresponds to the voltage $V_{low2}$ in FIG. 11.

The pressure and temperature within the chamber are maintained at $P_{MIN}$ and $T_{MAX}$ for a short period of time (say 1 minute) to ensure that the microcontroller has sufficient time to detect the steady state and to store data representative thereof in the RAM. Then the temperature in the chamber is reduced to $T_{MIN}$. The value of $T_{MIN}$ may be any convenient value but should be greater than normal ambient temperature to avoid the need for refrigeration of the chamber to counter warm atmospheric conditions. A temperature of 25° C. is suitable for most days in the United Kingdom.

The reduction of temperature to $T_{MIN}$ is represented by box 141 in FIG. 12 and the $P_{MIN}$ and $T_{MIN}$ steady state condition is shown at line 142 in FIG. 13. When the temperature in the chamber has fallen to $T_{MIN}$ data representing the voltage $V_{low1}$, shown in FIG. 11, is stored in the RAM. There is very little delay in determining when the temperature in the chamber has fallen to $T_{MIN}$ because the thermistor in the wheel unit is highly accurate and produces known output for a given temperature. Nevertheless, it is good practice to maintain the minimum pressure and temperature condition within the chamber for a short period of time to ensure that the condition is detected and data is stored in the RAM by the microcontroller. The detecting of $T_{MIN}$ and storing of data representing the output for $P_{MIN}$ is represented by box 143 in FIG. 12.

Once the period of time for storing the value corresponding to $V_{low1}$ has elapsed, the pressure in the chamber is again raised to $P_{MAX}$ while the temperature is maintained at $T_{MIN}$, as represented by the step 144 in FIG. 12. The microcontroller monitors the output from the pressure sensor. When the output stabilises the microcontroller assumes that the output corresponds to the value of $P_{MAX}$ at $T_{MIN}$ (the condition shown at line 145 in FIG. 13) and stores a value corresponding to $V_{high1}$ (see FIG. 11) in the RAM. This storing operation is represented by step 16 in FIG. 12.

The storing of the value for $V_{high1}$ means that all of the calibration data has been acquired and this causes the microcontroller to exit the calibration mode by ceasing the flashing of the LED and entering the normal mode of operation. This is represented by the box 147 in FIG. 12. When the unit is removed from the chamber on completion of the calibration it is a simple matter to determine whether or not the unit has been successfully calibrated simply by examining the LED. If the LED is not flashing, the unit has been calibrated, but if it is still flashing, then something has failed in the calibration procedure. It is a simple matter to examine individual failed units for the nature of the failure and either to discard failed units or reset failed units (by removing and replacing the internal battery) for recalibration.

The above described calibration procedure does not require any interaction between an operator or external systems. The changes in pressure and temperature provide the stimuli that cause the microcontroller to read signals from the sensors and store data representative thereof in RAM as calibration data.

With data representing the four values $V_{low1}$, $V_{low2}$, $V_{high1}$ and $V_{high2}$, stored in the RAM the microcontroller can determine various parameters for use in calculating the pressure sensed by the pressure sensor.

The gradient of the lines 131, 132 are calculated from the equations:

$$\text{Grad1} = (V_{high1} - V_{low1})/\Delta P_1 \quad (1)$$

where $\Delta P_1$=change in pressure between $V_{low1}$ and $V_{high1}$ $$\text{Grad2} = (V_{high2} - V_{low2})/\Delta P_2 \quad (2)$$

where $\Delta P_2$=change in pressure between $V_{low2}$ and $V_{high2}$.

The rate of change between the gradients with temperature, i.e. the gradient of the gradients over temperature (Gradgrad) is determined from:

$$\text{Gradgrad} = (\text{Grad2} - \text{Grad1})/\Delta T \quad (3)$$

where $\Delta T$=change in temperature between line 131 and line 132.

The rate of change of the offset of the lines 131, 132 with temperature, i.e. the gradient of the offset over temperature is determined from:

$$\text{Offsetgrad} = (V_{low2} - V_{low1})/\Delta T \quad (4)$$

The parameters Grad1, Grad2, Gradgrad and Offsetgrad from equations (1) to (4) enable a line to be determined representing the output from the pressure sensor at a given temperature (Temp). The function will have an offset calculated from:

$$\text{Offset} = V_{low1} + \text{Offsetgrad}(\text{Temp} - T1) \quad (5)$$

where T1 is the temperature for line 131 and a gradient calculated from:

$$\text{Grad} = \text{Grad1} + \text{Gradgrad}(\text{Temp} - T1) \quad (6)$$

The output characteristics of the thermistor are known and predictable which enables a temperature value to be determined directly from the signal output from the thermistor. It is therefore a simple matter to convert the raw data from the thermistor signal into data representing the temperature in a suitable scale, e.g. degrees celsius, for use in determining the sensed pressure. With the temperature information (Temp) the microcontroller uses equations (5) and (6) to determine from the signal output from the pressure sensor a pressure value in convenient units, e.g. psi. Data representing the pressure value and the temperature value are then transmitted by the wheel unit to be received by the receiver unit. Thus, before transmission by the wheel unit, the signals from the pressure and temperature sensors are converted into data represented directly the sensed pressure in psi and temperature in degree celsius. That is to say, the calibration and compensation of the data occurs within the wheel unit prior to transmission. This removes the need for the receiver to carry calibration information for the wheel units in order to decode the received data.

Simplified Alternative Calibration and Operation

In practice the difference between $V_{low1}$ and $V_{low2}$ will be very small, typically 1%. Also, the rate of change of the gradient with temperature, i.e. Gradgrad, for all pressure sensors is very similar and is therefore predictable to a reasonable degree of accuracy. It is possible to simplify the above described calibration procedure for wheel units in systems where high precision is not required. The simplification is to assume that the value of the parameter Offset is zero and that Gradgrad is a predetermined constant which is the same for every sensor. Prom consideration of the above equations (1) to (6) and the graphs in FIG. 11 it will be appreciated that if Offset is set to zero and Gradgrad is set to a predetermined constant then there is no need to acquire the values $V_{low2}$ and $V_{high2}$ because a value of pressure can be determined simply by calculating the pressure with reference to line 131 as adjusted by the predetermined value of Gradgrad, and the value of Temp acquired from the thermistor. That is to say, it is only necessary to obtain values for $V_{low1}$ and $V_{high1}$ during the calibration procedure.

Figure 14:
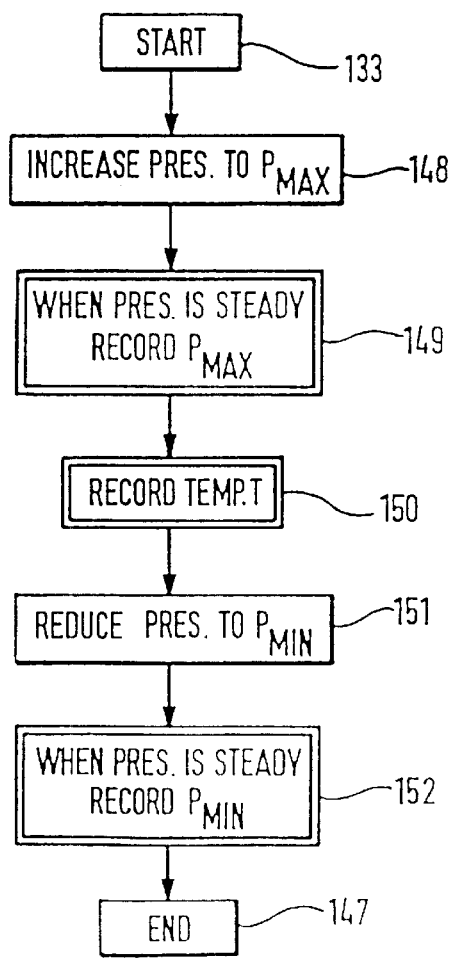
FIG. 14 is a flow diagram of a simplified sensor calibration procedure.

Consequently, the calibration procedure can be simplified to that shown in FIG. 14 of the accompanying drawings. The simplified procedure starts at box 133 in a similar manner to the previously described calibration procedure. The pressure in the chamber is increased to $P_{MAX}$ as represented by the box 148. The output signal from the pressure sensor is monitored and when the signal settles down to a steady value it is assumed that the pressure in the chamber is equal to $P_{MAX}$. Data representing the value of $P_{MAX}$ is stored in the RAM by the microcontroller in this step 149.

In order to be able to compensate for temperature changes it is necessary to know what the temperature was during calibration. Data representing the temperature in the chamber is stored in the RAM by the microcontroller as the next stage 150 in the procedure.

Next, the pressure in the chamber is reduced to $P_{MIN}$ in step 151. The output signal from the pressure sensor is monitored and when the signal settles down to a steady value it is assumed that the pressure in the chamber is equal to $P_{MIN}$. As the next step 152 in the procedure data representing the value of $P_{MIN}$ is recorded in the RAM by the microcontroller. The microcontroller then exits the calibration mode in a similar manner to the end step 147 of the previously described calibration procedure.

It will be appreciated that the outputs $V_{low1}$ and $V_{high1}$ can be measured in any order. It will also be appreciated that if the temperature in the calibration chamber is held at a known constant value during the procedure, then there is no need to record the temperature. The temperature can instead be prerecorded either as data in ROM or as a parameter written into the calculations performed by the microcontroller.

As advantage of the simplified procedure is that it does not require any control over the temperature in the calibration chamber. Instead, it is only necessary to record the temperature at which the calibration was performed. This enables the construction of the chamber to be simplified and consequent cost savings to be realised. A disadvantage is that there is a small loss of accuracy, albeit that the reduced accuracy will be acceptable for most applications.

Alternative Data Transmission

The above described transmission of data using a Manchester encoded on-off keying technique allows the inaccuracies that are introduced by use of a relatively inaccurate RC oscillator to be accommodated. The use of a ceramic resonator as the clock oscillator in the wheel unit increases the accuracy of data transmission by improving transmission efficiency. A ceramic resonator is sufficiently accurate to overcome the need to use edge encoded data transmission such as Manchester encoding, thus enabling transmission efficiency to be improved. The transmitted data rate can be further increased by the use of frequency modulation. Each of these changes reduces the time taken to transmit data and thus reduces the time during which the transmitter will be on. As a result the overall power consumption will fall, increasing the overall installation life of the wheel unit.

Alternative Remote Excitation

In the above described alternative calibration and normal operation modes there is, of course, no need to transmit calibration data because the calibration is all done within the wheel unit before the pressure and temperature data is transmitted. Therefore, operation of the unit can be so modified that in response to a tyre being deflated and then re-inflated within a short period of time (a readily detectable condition) the microcontroller causes the transmitter to transmit identity data. This modification avoids the need for receiver circuitry within the wheel unit.

Alternative Transmission Format

The above described digital circuit in the wheel transmitter unit is designed for use with a resistor-capacitor oscillator. Such oscillators have a relatively large tolerance and in order to accommodate this a transmission format based on the Manchester coding method is proposed hereinabove. It is, however, possible instead to use a ceramic resonator or crystal oscillator. A ceramic resonator or crystal oscillator has a relatively small tolerance and, if used in the system, enables the data coding for transmission to be simplified.

Figure 15:
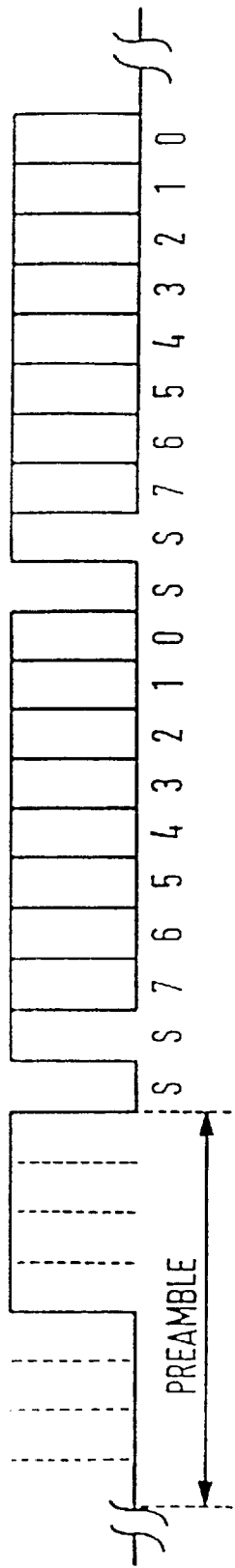
FIG. 15 is a schematic diagram of a data signal transmitted using an alternative transmission format.
Figure 16:
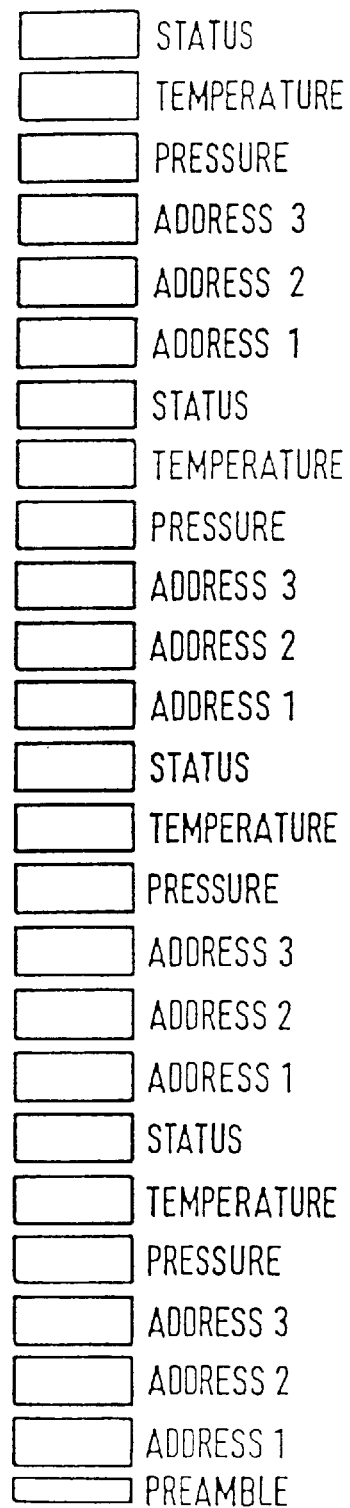
FIG. 16 is a schematic diagram of an alternative data format.

If the clock in the transmitter unit is a crystal type oscillator then non-return-to-zero coding, similar to the coding in the RS232 standard, can be used. As shown in FIG. 15 of the accompanying drawings data is output from the transmitter in the form of an initial preamble, followed by a synchronising zero, a synchronising one, and then eight bits of data representing sensed pressure or temperature. Each block of eight bits is separated by a synchronising zero and a synchronising one. As shown in FIG. 16 of the accompanying drawings, pressure and temperature data is transmitted four times for increased security.

Alternative Error Correction

The above described error correction technique involves convolution of the data. An alternative technique which is suitable for use in our tyre condition monitoring system is a bit-voting technique. Because temperature and pressure data are each transmitted four times it is possible to correct individual bits that may have been corrupted by noise or signal dropout by counting the number of zeros and/or ones for the same bit in each transmission. The value (zero or one) that is assigned to each bit is then selected as the most frequently occurring value.

For example, if the data transmitted was 11010010 and the data that was actually received was:

| | |
|---|---|
| 0 1 0 1 1 0 1 0 | (contains 2 errors) |
| 1 1 1 1 0 0 1 0 | (contains 1 error) |
| 1 1 0 1 0 0 1 1 | (contains 1 error) |
| 1 1 0 1 0 0 1 0 | (contains 0 errors) | then the bit majority data would be 11010010, which corresponds with the data actually transmitted.

Mounting the Wheel Transmitter Unit

Figure 17:
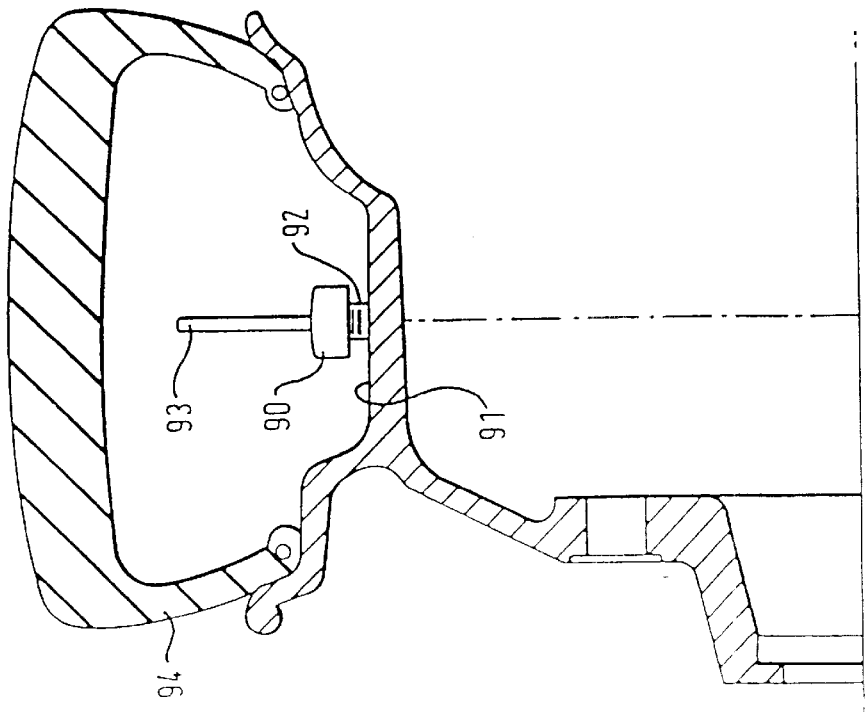
FIG. 17 is a schematic diagram of a wheel transmitter unit attached to the internal well of a wheel.

Turning now to FIG. 17 of the accompanying drawings there is shown a wheel transmitter unit 90 designed to be attached to the internal well 91 of a wheel by way of a retention strap 92 which runs around the well circumference. The wheel transmitter unit 90 comprises a monopole antenna 93 which extends away from the unit 90 and wheel well 91 towards a tyre 94 fitted to the wheel. Preferably, the antenna is a monopole because the metal of the wheel rim 91 acts as a ground plane. The antenna should protrude above the upper-most level of the rim in order that the radio signal can pass through the side wall of the tyre 94.

Figure 18:
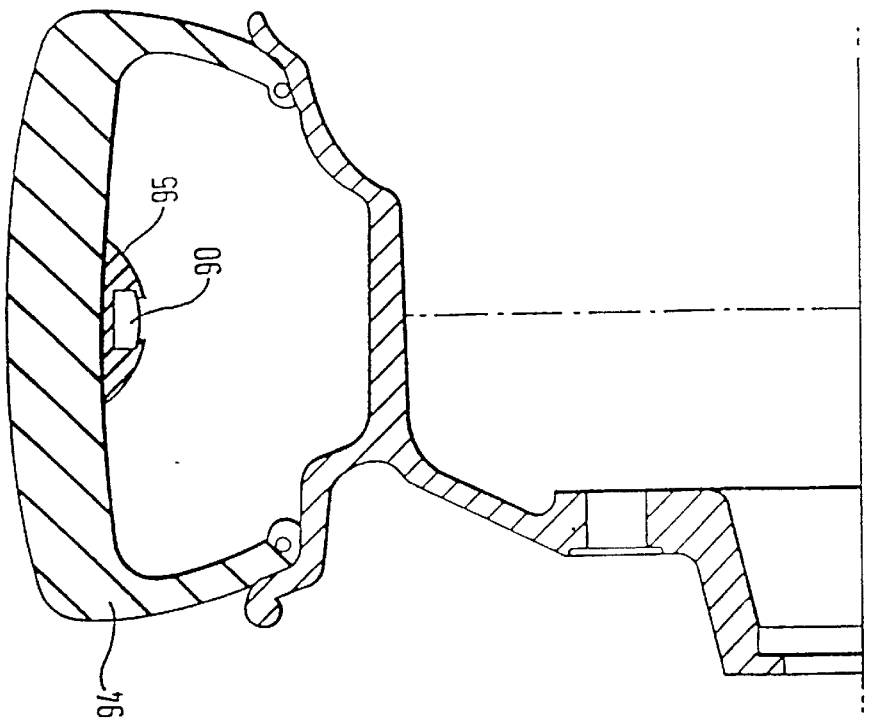
FIG. 18 is a schematic diagram of an alternative arrangement for fixing the wheel unit in a wheel.

The strap arrangement shown in FIG. 17 is preferred because it allows simple and rapid installation. The arrangement is versatile in that it can be attached to wheels of different diameters and construction without the need to alter the design of the module. An alternative arrangement shown in FIG. 18 of the accompanying drawings would be to adhere the unit 90 to the tyre 94 itself by way of a rubber mounting 95. The rubber mounting 95 would provide a rubber to rubber bond whilst also providing a flexible base to absorb a shock generated by the interface between the tyre and road. This method of attachment also reduces the need for an antenna external to the housing since the ground plane problems associated with the arrangement in FIG. 10 are overcome.

Another alternative arrangement, which may be suitable for commercial vehicles, would be to fasten the module to the outside of the wheel rim using a clamp arrangement. A connection to within the tyre could be made by way of a pneumatic hose which is hermetically sealed into the module at one end and connected to the tyre valve at the other end.

Receiver Unit

Figure 19:
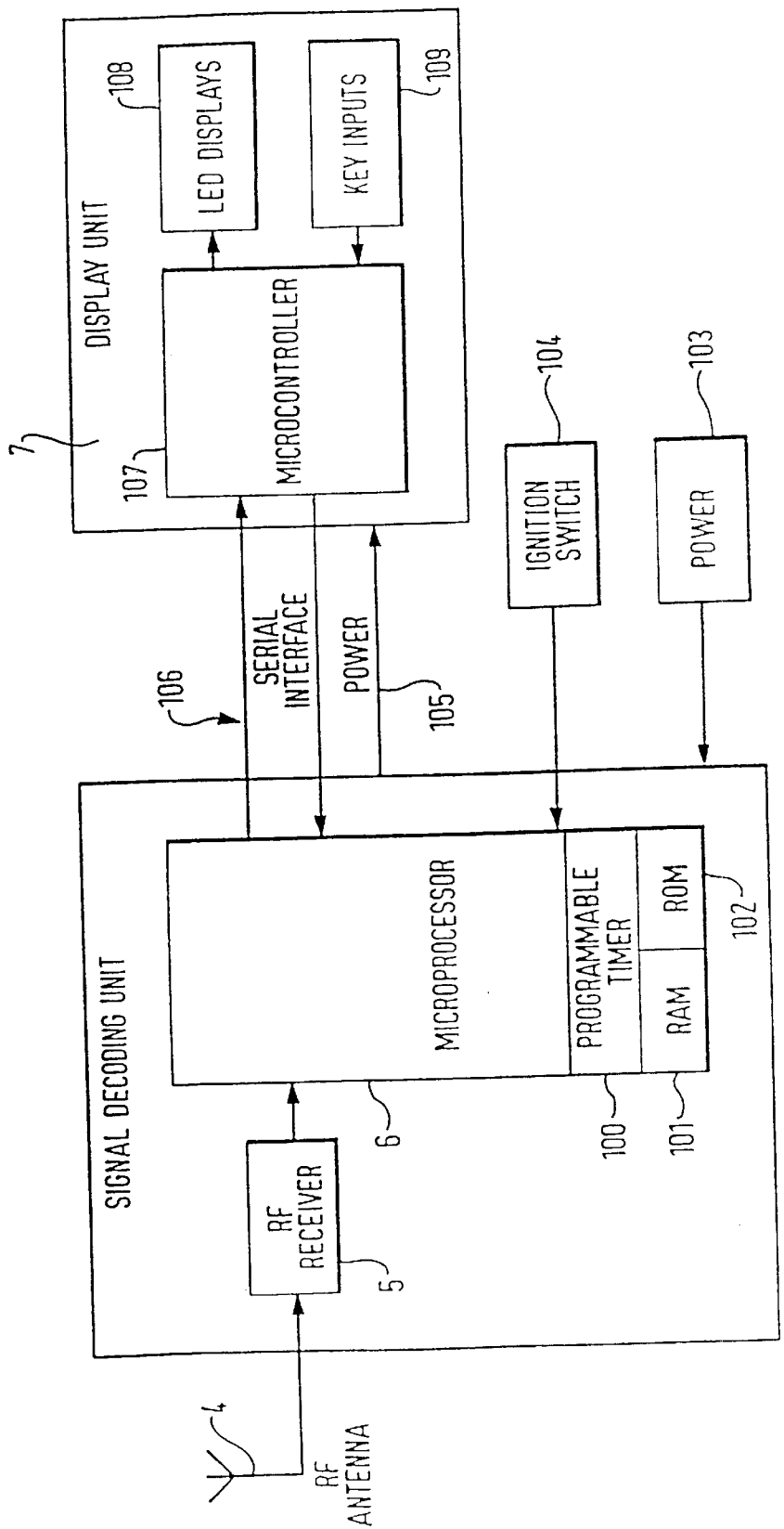
FIG. 19 is a schematic diagram of a receiver unit.

FIG. 19 of the accompanying drawings shows in schematic form the functional units which together form the receiver unit in the vehicle. Signals from each wheel transmitter unit 2 are received by the radio frequency antenna 4 and input to the radio frequency receiver 5 where they are demodulated. The demodulated signals are then input to the microprocessor 6 to enable the 32-bit blocks of data to be determined therefrom. The microprocessor 6 has associated with it a programmable timer 100 and random access and read only memories 101, 102. The RF receiver 5 and the microprocessor 6 together for a signal decoding unit which receives power at all times from a power supply 103. This enables signals from the wheel transmitter units to be received at all times, even when the vehicle is not in use. The power supply may be the vehicle's own battery or it may be a separate battery dedicated to the signal decoding unit. The microprocessor is also connected to the ignition switch 104 of the vehicle and receives a signal therefrom when the vehicle ignition is switched on. The microprocessor responds to the signal from the ignition switch by supplying power via line 105 to the display unit 7.

The demodulated signal from the RF receiver is decoded by the microprocessor and the programmable timer first by measuring the timing period 74 defined by the mark and space signals 76a, 76b at the beginning of the data stream (see FIG. 8) and then by sampling the signal to extract the 32-bit blocks of data therefrom. The 32-bit blocks of data are then deconvolved by the microprocessor to extract the 8-bit data therefrom.

The decoded data is equivalent to the data transmitted from the wheel transmitter unit, but the data may have been corrupted during transmission by either external noise or signal drop out. If there is a corruption of the data the decoding microprocessor is able to reconstruct the data under some circumstances during the decoding and deconvoluting operations. If the corruption is too great however the data is simply discarded as bad. The three transmissions of the data help to minimise the amount of data that is discarded.

More specifically, the demodulated digital data from the receiver is sampled by the decoding microprocessor 6 at a rate which yields up to 40 samples per data bit. The exact sampling rate required to achieve this number of samples, of course, depends on the rate at which data is transmitted, but typically a sampling rate of 10 KHz will be sufficient.

The samples are filtered with reference to the timing pulse provided at the beginning of each transmission in order to remove spurious noise spikes. The timing pulse comprises a mark 76a and a space 76b (see FIG. 8) each of a single data bit length in duration. The mark and space are measured by the microprocessor which thereby determines the length of a single data bit in the data stream. Before any of the data is sampled, the duration of the mark and the space are determined and sampling only continues if the durations fall within specified limits. The decoding microprocessor uses the timing pulse to account for variations in transmitted data frequency. If the specified limits are not met then the received signal is assumed to be noise and is ignored. Since the length of the expected data bit is known, this makes it possible for the encoding microprocessor 6 to decode bits which are corrupted or absent because of noise or signal drop out.

Once all blocks of transmitted data have been sampled into respective 32-bit fields, the fields are deconvolved by way of a look-up table (not shown) to extract three 8-bit words of identification data, an 8-bit word of pressure data and an 8-bit word of temperature data. The convolution/deconvolution method allows approximately five incorrect bits in each 32-bit block to be corrected. The alternative bit-voting method also enables data to be received with confidence. The 8-bit data is therefore accurate to a reasonably high degree. The raw data thus obtained is processed by the microprocessor 6 to determine the actual values of temperature and pressure in the tyre to which the data relates. The identification code for each wheel unit is stored in the RAM 102 during installation when the wheel units are transmitting in the remote excitation mode. This data enables the microprocessor to determine which wheel received data relates to when the system in operation. As will be explained in greater detail hereinafter data identifying the position of each wheel on the vehicle is input by a user, enabling the microprocessor also to determine the position of the wheel to which the incoming data relates.

The current decoded pressure data value ("$V_{CUR}$") and the current decoded temperature data value ("$T_{CUR}$") are stored next to the appropriate wheel identity data in the RAM 102. It will be recalled from the foregoing that during installation the following parameters are also stored in the RAM 102 namely:

$T_{CALIB}$=Calibration Temperature
$P_{CALIB}$=Calibration Pressure (60 psi)
$V_{CALIB}$=Pressure value at $P_{CALIB}$
$V_{ZERO}$=Pressure Value at 1 Atmosphere (0 psi)
$TEMP_{COEF}$=Constant Temperature Coefficient of Pressure Sensor These parameters are used with the incoming decoded data to calculate the actual temperature-compensated pressure ($P_{ACT}$) in the wheel from the equation:

$$P_{ACT} = (V_{CUR} - V_{ZERO})\frac{P_{CALIB}[1 + (T_{CUR} - T_{CALIB})TEMP_{COEFF}]}{V_{CALIB} - V_{ZERO}}$$

Since the thermistor 10 in the wheel transmitter unit (see FIG. 2) is a curve matched device, the characteristic curve of the thermistor is known. It is therefore a simple matter to convert the temperature data value $T_{CUR}$ into an actual temperature value in degrees celsius. A look-up table (not shown) is stored in the memory defining for each value of $T_{CUR}$ (0 to 255) a corresponding temperature value (° C.). The decoded data $T_{CUR}$ is applied as the input to the look-up table which responds thereto by outputting the corresponding actual temperature value. These calculations are, of course, unnecessary of the above described alternative modes of operation are used, because in the alternative modes the data is effectively calibrated before transmission.

As shown in FIG. 19, the microprocessor 6 communicates via a two-way serial interface 106 with a microcontroller 107 in the display unit 7. The microcontroller 107 receives pressure, temperature and wheel data from the microprocessor and converts the data into signals which are used to drive an LED display 108. As will be described in greater detail hereinafter the display unit also comprises several input keys represented by the block 109 by which a user can control the data displayed on the LED display unit 108. The bi-directional nature of-the serial interface 106 enables the microcontroller 107 to request data from the microprocessor 6 when signals are received from the key inputs 109 indicating that different data is required for display.

Display Unit

Figure 20:
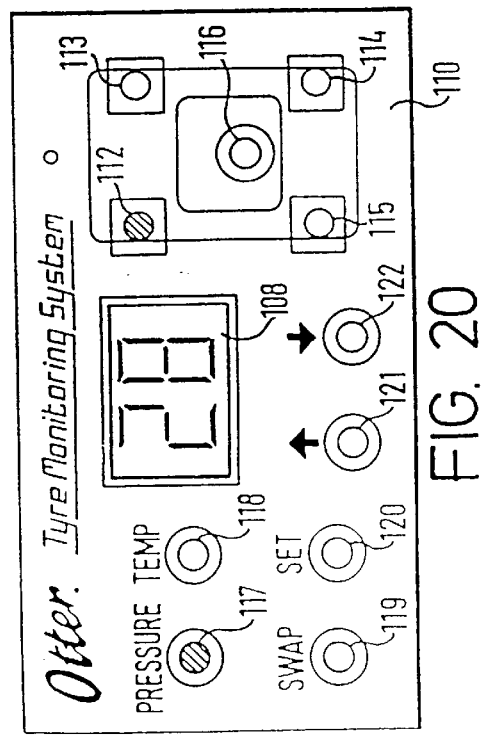
FIG. 20 is a view of the front cover of a display unit when operating in a pressure display mode.

FIG. 20 of the accompanying drawings shows a view of the front cover 110 of the display unit 7. The display of information on the front panel 110 is based around a two-digit LED display 108 which shows the temperature or pressure of a selected tyre. Five buttons 112 to 116, corresponding to a respective wheel of the vehicle are provided to enable selection of a wheel to be made. Six further control buttons 117 to 122 are also provided to enable the operator to control the displaying of data. Together the buttons 112 to 122 comprise the key inputs 109 depicted in FIG. 19 of the accompanying drawings. Each of the buttons 112 to 122 comprise a light emitting diode. The light emitting diodes in the buttons are activated by the microcontroller 107 to provide an indication of the type of data being displayed on the LED display 108. The display panel 110 can be used to display the pressure and temperature of any of the tyres on the vehicle including the spare. For example, in FIG. 20, the light emitting diode in control button 117 is illuminated indicating that the value 28 on the LED display 108 corresponds to a pressure value of 28 psi, and the LED illuminated in button 112 indicates that the display pressure pertains to the front left-side wheel of the vehicle.

Figure 21:
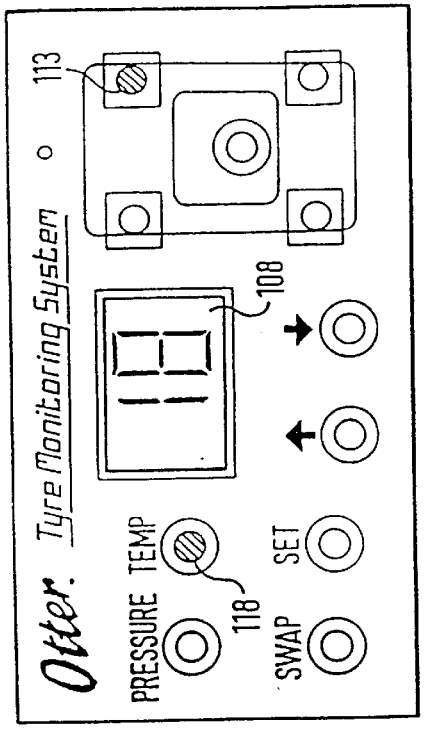
FIG. 21 is view of the front cover when operating in a temperature display mode.

Turning now to FIG. 21 of the accompanying drawings, the LED illuminated in control button 118 indicates that the value 18 displayed on the display 108 corresponds to a temperature at 18° C., and the LED illuminated in button 113 indicates that the display temperature is that of the front right-hand wheel of the vehicle.

Figure 22:
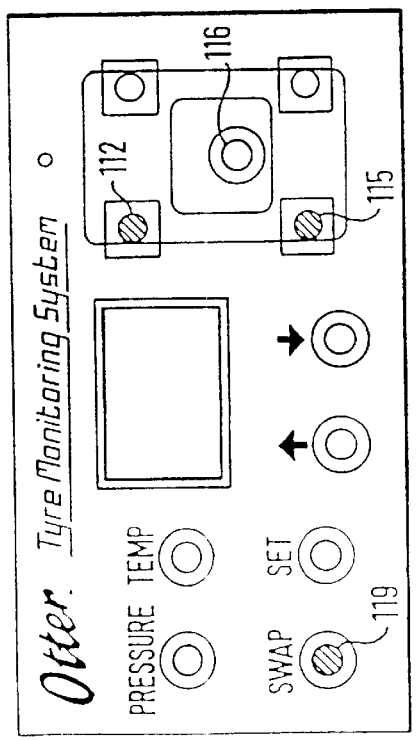
FIG. 22 is a view of the front cover when operating in a swap input mode.

Occasionally, the wheels of the vehicle will be swapped around, for example if a tyre is punctured the wheel with the punctured tyre will be replaced by the spare wheel. It is therefore necessary to be able to input this information to the monitoring system. Referring now to FIG. 22 of the accompanying drawings, this is achieved by pressing the control button 119 labelled "swap" and then pressing the two buttons, for example buttons 112 and 115 corresponding to the tyres which have been swapped. The system responds to the two buttons being pressed by emitting an audible signal through a loudspeaker or the like (not shown). Depressing the two buttons 112 and 115 again following the audible signal is taken as confirmation that the two wheels have indeed been swapped. In response to the confirmation the microcontroller 107 (see FIG. 19) sends control data to the microprocessor 6 via the serial interface 106. The microprocessor 6 responds to the control data by exchanging the corresponding data in the RAM 101. It is assumed that usually the spare wheel will be involved in the swap. The system is therefore arranged to respond to the "swap" button 119 being depressed by illuminating the LED in the button 116 corresponding to the spare wheel. This simplifies the operation by requiring the user only to depress one other button in the event that the spare wheel is indeed involved in the swap.

Figure 23:
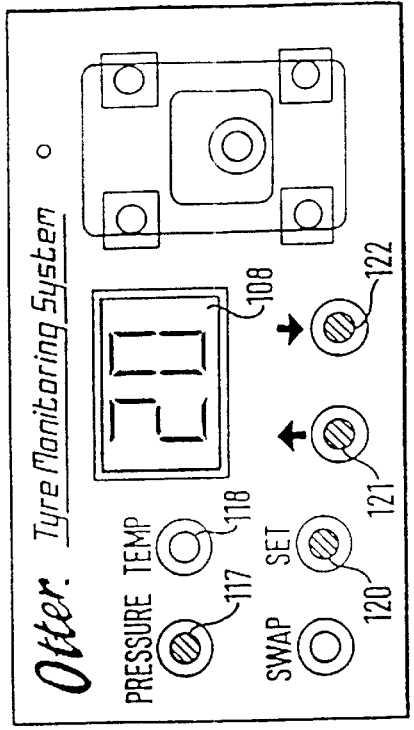
FIG. 23 is a view of the front cover when operating in a threshold input mode.

The system also allows warning thresholds to be set for both pressure and temperature. Once thresholds have been set, the system is arranged to emit an audible warning if in any wheel the pressure falls below the pressure threshold or the temperature rises above the temperature threshold. At the same time, the LED is illuminated in the control button 112 to 116 corresponding to the tyre in which the threshold has been passed. Referring to FIG. 23, the pressure threshold is defined by first depressing the control button 120 labelled "set" and then depressing the pressure control button 117. The pressing of these two control buttons 117 and 120 is interpreted by the microcontroller 107 as an instruction to set the pressure threshold below which the pressure in each wheel should not be allowed to fall. The pressure threshold is then selected by repeated pressing of the two control buttons 121 and 122 until the selected pressure threshold value is displayed on the display 108. Once the selected value has been displayed, pressing the "set" button 120 again is interpreted as confirmation of the selected value. In the example shown in FIG. 23 a pressure threshold of 20 psi has been chosen by way of the control buttons 121 and 122 and depressing the "set" button 120 would result in the displayed pressure being set as the threshold. Similarly, pressing the "set" button 120 and then the "temp" button 118 enables the temperature threshold to be set. In the event that a threshold is exceeded, then the actual value of the temperature or pressure will be displayed on the display 108, the LED in the appropriate button 112 to 116 corresponding to the faulty wheel will flash, and the LED in either the "pressure" or "temperature" button 117 or 118 will also flash, depending on which parameter threshold has been crossed by the faulty wheel.

General Overview of a Second System

In some applications it is necessary that the data be acquired with high reliability. Reliability rates of just one or two transmission errors in 50,000 miles are of course possible using the above described wheel transmitter units and central receiver, but at the cost of using expensive, close tolerance components. An alternative to such an expensive option is to use two-way communication between the processing in the wheel unit and the processing by the decoding microprocessor in the central unit.

Figure 24:
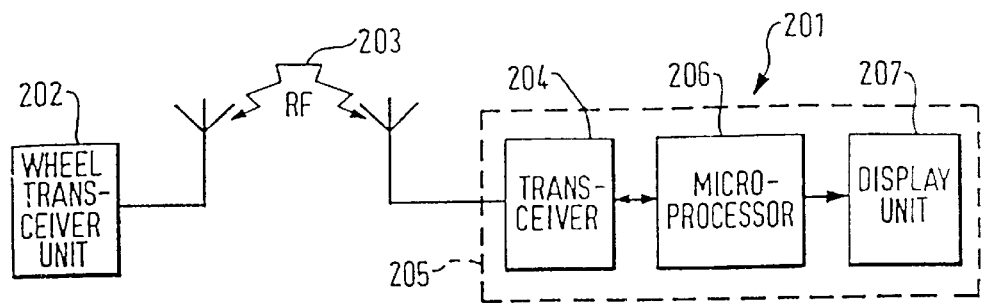
FIG. 24 is a schematic diagram of a second system embodying the invention.

FIG. 24 of the accompanying drawings is a schematic diagram of a system 201 embodying the invention, in which system two-way communication is made possible by way of a transceiver in a wheel unit 202 which communicates via a radio frequency link 203 with a transceiver 204, provided in a central controller unit 205 together with a decoding microprocessor 206 and a display unit 207. As with the first described system it is envisaged that in practice the system 201 will comprise a wheel transmitter unit for each wheel of the vehicle.

Wheel Transceiver Unit

Figure 25:
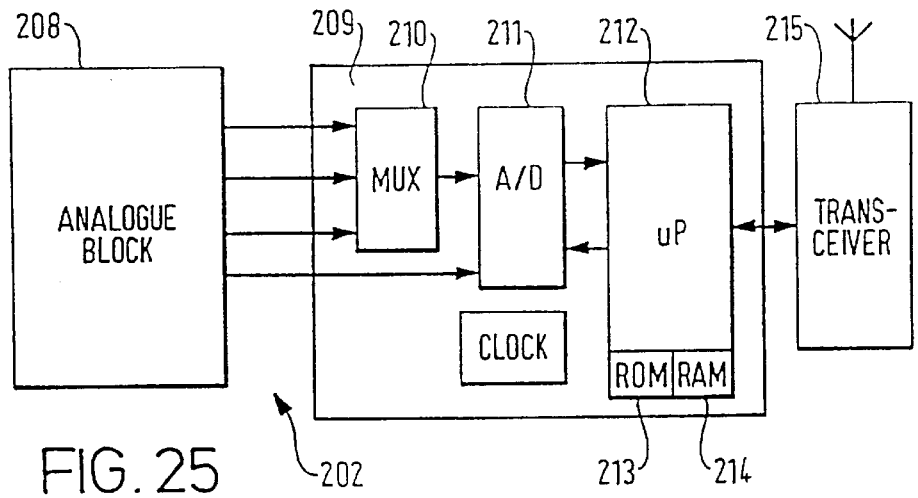
FIG. 25 is a schematic diagram of circuitry associated with a wheel transceiver unit.

The circuitry associated with the wheel transceiver unit 202 is shown in greater detail in FIG. 25 of the accompanying drawings. Each wheel transceiver unit 202 comprises an analog circuit in an analog block 208 and a digital circuit in a digital block 209. The analog block 208 is equivalent to the analog block 8a in FIG. 2 of the accompanying drawings and will not be described in further detail herein. The digital block 209 is similar to the digital block 8b in FIG. 2 insofar as the block 209 comprises a multiplexer 210, an analog to digital converter 211 for converting signals from the analog block into digital form, and a microprocessor 212 and associated ROM 213 and RAM 214 for processing data from the analog to digital converter 211. The microprocessor 212 is connected to a transceiver 215 which transmits processed data from the microprocessor. The transceiver also receives data from the transceiver 204 in the central unit 205, which data is demodulated and converted into suitable digital form for the microprocessor 212 by the transceiver 215.

Figure 26:
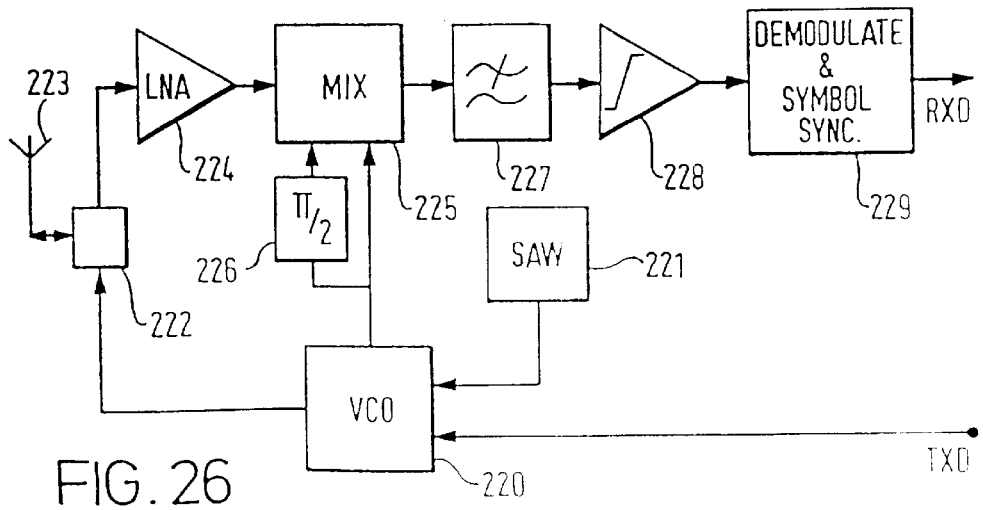
FIG. 26 is a schematic diagram of one transceiver circuit.

FIG. 26 of the accompanying drawings shows a first transceiver circuit in which data to be transmitted (TXD) is input to a voltage controlled oscillator (VCO) 220 where the data is used to frequency modulate a signal output from a surface acoustic wave (SAW) resonator 221. The modulated data signal output from the VCO 220 is at radio frequency, e.g. 433 MHz, and is output via a switching circuit 222 to an antenna 223 for transmission. The antenna 223 also serves to receive transmitted frequency modulated signals which are input via the switching circuit 222 to a low noise amplifier (LNA) 224 the thus amplified signal is input to a mixer 225 which also receives an in-phase signal from the VCO 220 and a quadrature signal via a phase shifter 226. The mixer 225 produces two outputs, i.e. in-phase and quadrature, which are input to respective low pass filters 227 and threshold detectors 228, of which only one of each is shown for the sake of clarity. The thus processed signals from the threshold detectors 228 are input to a demodulator circuit 229 which performs a direct conversion (zero-IF) frequency (FSK) demodulation of the signals based on zero crossings and the phase relationship between the in-phase and quadrature signals. The demodulator circuit 229 is arranged also to synchronise with the demodulated signals so that the received data (RXD) output therefrom is in a suitable form for input to the microprocessor 206 (see FIG. 24).

An advantage of the transceiver circuit shown in FIG. 26 is that it only requires a small chip area to be implemented, therefore reducing chip costs. However, the use of a SAW resonator is relatively expensive. The frequency deviation of the transceiver depends on the accuracy of the SAW resonator. Less precise SAW resonators can be used in order to reduce cost in the wheel transceiver unit as long as the reduction in accuracy is compensated for elsewhere in the system, e.g. the transceiver 204 in the central unit 205.

Figure 27:
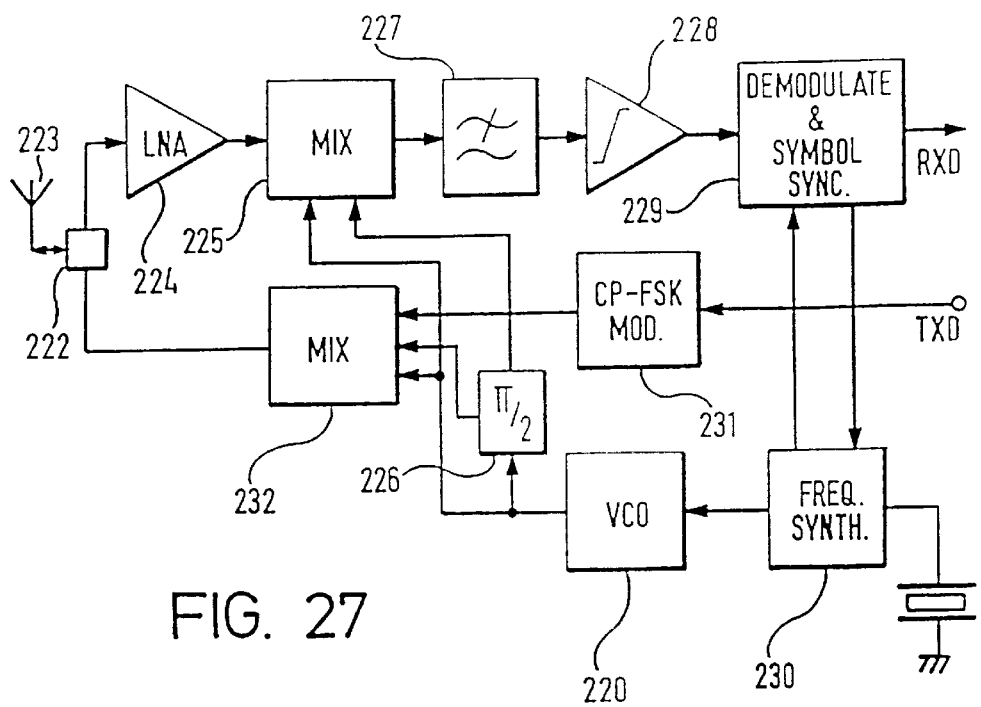
FIG. 27 is a schematic diagram of another transceiver unit.

An alternative transceiver design is shown in FIG. 27 of the accompanying drawings. The transceiver shown in FIG. 27 comprises a crystal-based frequency synthesizer 230 which provides reference signals for driving the VCO 220 and the demodulator 229. The data to be transmitted (TXD) is input to a continuous phase-FSK modulator 231. The output signal from the modulator is input to a mixer where it is mixed with in-phase and quadrature signals from the VCO 220 to produce a modulated RF signal which is output for transmission via the switching circuit 222 and antenna 223. The use of a crystal reduces the cost of the transceiver circuit but requires a frequency synthesizer 230 to provide the automatic frequency control necessary to achieve the required frequency precision.

It is envisaged that in mass production the same transceiver circuit will be used in both the wheel transceiver unit 202 and as the transceiver 204 in the central unit 205 (see FIG. 24). However, it is not necessary for both transceivers to be the same, and advantages in terms of optimisation may be obtained by the use of different transceiver circuits in the wheel unit and in the central unit. For example reliability/cost may be optimised by using a less expensive transceiver in each wheel unit and a more accurate transceiver in the central unit.

The use of transceivers in the system enables two-way communication to be realised between the central unit 205 and the or each wheel unit 202. In order that the transmission of commands from the central unit to the wheel transceiver units are not lost, it is necessary for the wheel transceiver units to monitor at all times for the transmission of commands from the central unit. One way in which such monitoring can be effected is to apply power continuously to at least the receiver part of the transceiver in each wheel unit. However, this is wasteful of power and considerably reduces the useful life of the wheel unit. Clearly, therefore, the transceiver in the wheel unit should not be continuously powered, but instead should be energised periodically for a short period of time sufficient to determine whether a command is being transmitted from the central unit.

A system of so-called channel polling is utilised in which the transmission of each command from the central unit is preceded by the transmission of a preamble signal. In a simple channel polling system the receiver in the wheel unit would be energised every n seconds to enable the presence of a preamble signal to be determined. The preamble signal would last for at least n seconds in order to ensure that each receiver would detect the preamble signal. When a preamble signal was detected by the receiver in the wheel unit, the receiver would remain powered up until a command was received, decoded and executed, at which time the wheel unit would again be powered down. Using this system, the receiver would be energised on average for $(n/2+T_c)$ seconds, where $T_c$ is the time period in which the command signal is broadcast and is considerably less than n/2. Using this simply system the wheel unit transceiver does not know when the command will be transmitted, it only knows that the command will be transmitted within the next n seconds. Furthermore, the time that the receiver is powered during the preamble signal is in fact the period in which energy is wasted.

In order to reduce further the consumption of power by the wheel unit, a presently preferred channel polling system uses a preamble signal containing information about the time remaining until the command is actually transmitted. Such information enables the wheel unit to decide whether to power down if there is a relatively long period of time until the transmission of the command, or to wait for the command if the period until the command is transmitted is relatively short.

Figure 28:
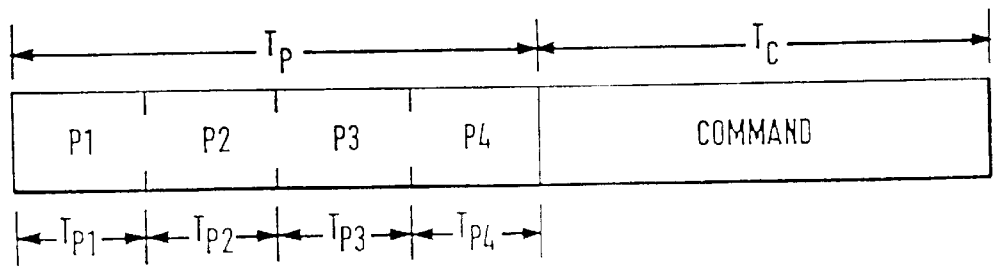
FIG. 28 is a timing diagram of a command transmission to a wheel unit.

FIG. 28 of the accompanying drawings illustrates a format of data transmission used in the presently preferred channel polling system. Each transmission comprises a preamble of duration $T_p$ and a command period of duration $T_c$. The preamble is itself divided into four periods of preamble P1 to P4 of duration $T_{P1}$ to $T_{P4}$. The duration $T_{P1}$ to $T_{P4}$ of each preamble period P1 to P4 is the same. During each preamble period P1 to P4 a square wave is transmitted at a different frequency. Thus, in preamble P1 a square wave at 2.5 kHz is transmitted, in P2 a square wave of 1.84 kHz is transmitted, in P3 a square wave of 1.36 kHz is transmitted and in P4 a square wave of 1 kHz is transmitted.

The receiver part of the wheel transceiver unit is energised at regular intervals. The time between energisations is selected to be less than the duration $T_P$ of the period. Typically, $T_P$ is chosen to be 25% longer than the period between energisations of the receiver in the wheel unit. This ensures that the receiver is energised at least once during a preamble.

The wheel unit is arranged to respond differently depending upon which polling signal P1 to P4 is received. In the above example if a signal of 1 kHz is received, then that indicates that the next transmission from the central unit 205 will be a command. The transceiver unit therefore remains energised waiting to receive the command. If a signal of 1.36 kHz is received there is at least one (and possibly nearly two) preamble period until the command is transmitted and therefore the transceiver unit can power down for one preamble period $T_{P4}$. If a signal of 1.84 kHz is received then there are two preambles then there are two preambles to be-transmitted before the command and the transceiver unit can be powered down for two periods $T_{P3}+T_{P4}$. Similarly, if a signal of 2.5 kHz is received the transceiver unit can be powered down for three periods $T_{P2}+T_{P3}+T_{P4}$.

This scheme reduces the time that the receiver in the wheel transceiver unit is powered up to an average of $T_{Pn}/8$, as compared with $T_{Pn}/2$ in the above described simply polling system.

It should be noted that, as compared with the system shown in FIG. 2, the wheel transceiver unit 202 does not include a centrifugal detector or a mode select facility, these features being replaced by the transceiver 215.

Since there is two-way communication between the wheel units and the central unit, a degree of intelligence can be built in to the system. The microprocessor in the wheel unit is configured to respond to commands received by the transceiver by acquiring data representing the parameters sensed by the analog block and outputting that data to the transceiver for transmission. The central unit can be linked to the ignition of the vehicle in order to determine whether or not the vehicle is in use. When the vehicle is in use, the central unit can command the wheel transceiver units to go into a "active" mode in which the receiver of the wheel unit is energised, say, every 5 seconds to monitor for commands from the central unit. When the vehicle is not in use, the central unit can be arranged to command the wheel transceiver units to go into a "park" mode in which polling occurs, say, only every 30 seconds.

In order to ensure integrity of the data, a handshaking routine can be employed in which the identity code is transmitted to each wheel unit followed by a command for each wheel unit to transmit data including the identity code back to the central unit.

The use of two-way communication enables the calibration procedure to be simplified. During calibration, as described hereinabove, each wheel unit is exposed to calibrated temperatures and pressures. When those pressures are reached, a command can be transmitted to each wheel unit instructing the wheel unit to store the sensor readings. In order to ensure security of the identification code and the calibration data, those values should be made unalterable, other than disassembling the system, once they have been stored.

During normal operation in the "active" mode to command the wheel units to transmit sensor readings every two seconds. In addition, sensor data and/or calibration data can be transmitted on request if there has been a sudden change in conditions since the last transmission.

It will be appreciated from the foregoing that the use of transceivers in the system provides a degree of intelligence to the system. The use of a channel polling system enables the intelligence to be obtained without significant power consumption costs. The transceivers also enable the circuitry to be simplified by doing away with the need for a centrifugal detector to determine whether or not the vehicle is in use, a mode selector to change operation between installation and normal use, and internal timers that decide when to transmit data.

The use of two-way communication also means that it is not necessary to program each wheel unit with a unique identity code during manufacture. Instead, if desired, an identity code unique to each wheel unit on the vehicle can be transmitted from the central unit to each wheel unit during installation.

The foregoing description describes different embodiments and variations of those embodiments. For the sake of brevity each feature has been specifically described only once. It will, however, be appreciated that features described with respect to one embodiment or variation can be applied mutates mutandis to another embodiment or variation. Such applications of features are well within the scope of those possessed of the appropriate skills and therefore do not require explicit explanation herein.

Having thus described the present invention by reference to embodiments it is to be well understood that the embodiments in question are exemplary only and that modifications and variations such as will occur to those possessed of the appropriate knowledge and skills may be made without departure from the spirit and scope of the invention as set forth in the appended claims and equivalents thereof.

What is claimed is:

1. A wheel transmitter unit, mountable to a wheel, for a tyre condition monitoring system, comprising:
    a sensor for sensing one or more parameters associated with the wheel;
    a transmitter for transmitting data representing the sensed one or more parameters;
    a power supply for supplying power to the sensor and the transmitter; and
    a condition monitor arranged to respond to operating conditions of the wheel transmitter unit to vary the manner in which the transmitter unit transmits data, wherein the condition monitor comprises a power supply monitor arranged to respond to a low power condition being sensed by causing the transmitter to transmit data indicative of the low power condition, and wherein the condition monitor is arranged to cause the transmitter to transmit the data indicative of the low power condition in place of the sensed parameter data.

2. A wheel transmitter unit, mountable to a wheel, for a tyre condition monitoring system, comprising:
    a sensor for sensing one or more parameters associated with the wheel;
    a transmitter for transmitting data representing the sensed one or more parameters;
    a power supply for supplying power to the sensor and the transmitter; and
    a condition monitor arranged to respond to operating conditions of the wheel transmitter unit to vary the manner in which the transmitter unit transmits data, wherein the condition monitor is operable to monitor the sensed parameters at closely spaced instances and to apply power to the transmitter for the transmission of data when there has been a significant change in the sensed parameters since the previous transmission of data.

3. A wheel transmitter unit, mountable to a wheel, for a tyre condition monitoring system, comprising:
    a sensor for sensing one or more parameters associated with the wheel;
    a transmitter for transmitting data representing the sensed one or more parameters;
    a power supply for supplying power to the sensor and the transmitter;
    a condition monitor arranged to respond to operating conditions of the wheel transmitter unit to vary the manner in which the transmitter unit transmits data; and
    a processor for processing signals from the sensor representing the sensed one or more parameters to produce parameter data, the processor being operable in a plurality of different modes including a calibration mode in which parameter data is recorded for known wheel conditions and a normal operating mode in which data representing the one or more sensed parameters is transmitted by the transmitter, wherein, in the calibration mode, pressure and temperature data are recorded for two different pressure conditions under the same temperature condition.

4. A wheel transmitter unit as claimed in claim 3, wherein, in the normal operating mode, data representing the temperature of and pressure in the wheel is transmitted together with data identifying the wheel.

5. A wheel transmitter unit as claimed in claim 3, wherein the processor is operable in an installation mode in which the recorded data representing the pressure and temperature of the wheel is transmitted together with the data recorded in the calibration mode.

6. A wheel transmitter unit, mountable to a wheel, for a tyre condition monitoring system, comprising:
    a sensor for sensing one or more parameters associated with the wheel;
    a transmitter for transmitting data representing the sensed one or more parameters;
    a power supply for supplying power to the sensor and the transmitter;
    a condition monitor arranged to respond to operating conditions of the wheel transmitter unit to vary the manner in which the transmitter unit transmits data; and
    a processor for processing signals from the sensor representing the sensed one or more parameters to produce parameter data, the processor being operable in a plurality of different modes including a calibration mode in which parameter data is recorded for known wheel conditions and a normal operating mode in which data representing the one or more sensed parameters is transmitted by the transmitter, wherein the processor is arranged to produce timing information as part of the data for transmission and the timing information comprises a mark signal and a space signal which are transmitted prior to the transmission of the data representing the sensed one; or more parameters.

* * * * *